United States Patent
Clauss et al.

(10) Patent No.: US 9,920,215 B2
(45) Date of Patent: Mar. 20, 2018

(54) COATING MATERIAL COMPOSITIONS AND LOW-TEMPERATURE-CURABLE COATINGS PRODUCED THEREFROM, AND USE THEREOF

(71) Applicant: BASF Coatings GmbH, Muenster (DE)

(72) Inventors: Reinhold Clauss, Steinfurt (DE); Rainer Klopsch, Worms (DE); Susanne Katharina Kreth, Muenster (DE); Britta Schnieders, Meppen (DE); Ursula Heimeier, Sendenhorst (DE); Cathrin Corten, Unna (DE); Peter Hoffmann, Senden (DE); Aaron Flores-Figueroa, Mannheim (DE); Kristin Michel, Sendenhorst (DE); Annika Werning, Oldenburg (DE)

(73) Assignee: BASF Coatings GmbH, Muenster (DE)

( * ) Notice: Subject to any disclaimer, the term of this patent is extended or adjusted under 35 U.S.C. 154(b) by 63 days.

(21) Appl. No.: 14/917,722

(22) PCT Filed: Aug. 8, 2014

(86) PCT No.: PCT/EP2014/067076
§ 371 (c)(1),
(2) Date: Mar. 9, 2016

(87) PCT Pub. No.: WO2015/039807
PCT Pub. Date: Mar. 26, 2015

(65) Prior Publication Data
US 2016/0215162 A1    Jul. 28, 2016

(30) Foreign Application Priority Data
Sep. 23, 2013 (EP) .................................... 13185573

(51) Int. Cl.
| B32B 27/30 | (2006.01) |
|---|---|
| C09D 133/14 | (2006.01) |
| C09D 167/02 | (2006.01) |

(52) U.S. Cl.
CPC ......... C09D 133/14 (2013.01); C09D 167/02 (2013.01)

(58) Field of Classification Search
CPC ..................................................... C09D 133/14
USPC ............................................................ 428/522
See application file for complete search history.

(56) References Cited

U.S. PATENT DOCUMENTS

| 4,772,666 A | 9/1988 | Just et al. |
|---|---|---|
| 5,240,835 A | 8/1993 | Pettrone et al. |
| 6,090,891 A * | 7/2000 | Frischinger ........ C08G 59/1405 525/111 |
| 6,946,515 B1 | 9/2005 | Lettmann et al. |

FOREIGN PATENT DOCUMENTS

| DE | 1 098 953 | 2/1961 |
|---|---|---|
| DE | 34 33 403 A1 | 3/1986 |
| DE | 10 2009 003 035 A1 | 11/2010 |
| EP | 0 272 664 A2 | 6/1988 |
| EP | 0 692 007 A1 | 1/1996 |
| EP | 0 837 062 A1 | 4/1998 |
| EP | 0 881 262 A2 | 12/1998 |
| EP | 0 994 117 A1 | 4/2000 |
| EP | 1 273 640 A2 | 1/2003 |
| EP | 1 448 619 B1 | 3/2010 |
| JP | 2006-137733 A | 6/2006 |
| JP | 2008-222619 A | 9/2008 |
| WO | 94/22969 A1 | 10/1994 |
| WO | 96/26224 A1 | 8/1996 |
| WO | 01/09260 A1 | 2/2001 |
| WO | 2004/005088 A1 | 1/2004 |
| WO | 2011/157671 A1 | 12/2011 |
| WO | 2012/123161 A1 | 9/2012 |
| WO | 2012/123166 A1 | 9/2012 |
| WO | 2012/123198 A1 | 9/2012 |
| WO | 2012/126796 A1 | 9/2012 |
| WO | 2012/130718 A1 | 10/2012 |
| WO | 2013/110712 A1 | 8/2013 |
| WO | 2013/144299 A1 | 10/2013 |

OTHER PUBLICATIONS

International Search Report dated Jan. 14, 2015 in PCT/EP2014/067076 filed on Aug. 8, 2014.

* cited by examiner

*Primary Examiner* — Hui H Chin
(74) *Attorney, Agent, or Firm* — Oblon, McClelland, Maier & Neustadt, L.L.P.

(57) ABSTRACT

A nonaqueous coating material composition and coatings thereof are provided. The composition contains an oligomeric and/or polymeric compound (A) having at least two hydroxyl groups, an oligomeric and/or polymeric compound (B) having at least two alkylidene-1,3-dioxolan-2-one groups of formula (I'), and a catalyst (D)

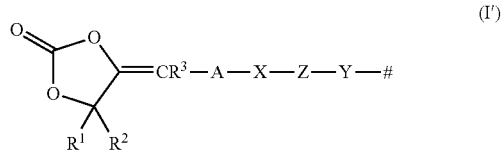

(I')

where # stands for the attachment to the polymer backbone and $R^1$, $R^2$ independently of one another are hydrogen, $C_1$-$C_6$ alkyl, $C_1$-$C_4$ alkoxy-$C_1$-$C_4$ alkyl, $C_5$-$C_6$ cycloalkyl, phenyl or phenyl-$C_1$-$C_4$ alkyl;
$R^3$ is hydrogen, $C_1$-$C_6$ alkyl, $C_1$-$C_4$ alkoxy-$C_1$-$C_4$ alkyl, $C_5$-$C_6$ cycloalkyl, phenyl, or phenyl-$C_1$-$C_4$ alkyl;
A is a chemical bond or $C_1$-$C_4$ alkanediyl;
X is O or $NR^7$;
Z is a chemical bond, $PO_2$, $SO_2$, or C=O;
Y is a chemical bond, $CH_2$, or $CHCH_3$, and
$R^7$ where present is $C_1$-$C_6$ alkyl.

16 Claims, No Drawings

COATING MATERIAL COMPOSITIONS AND LOW-TEMPERATURE-CURABLE COATINGS PRODUCED THEREFROM, AND USE THEREOF

The present invention relates to nonaqueous coating material compositions comprising at least one polyhydroxyl group-containing compound (A) and at least one compound (B) having at least two alkylidene-1,3-dioxolan-2-one groups. The present invention further provides the coatings produced from these coating material compositions, and the use thereof, more particularly for automotive OEM finishing, automotive refinish, and the coating of parts for installation in or on vehicles, and also of plastics.

Coating material compositions based on polyurethanes (PU) find use in countless fields, more particularly for automotive OEM finishing and automotive refinish. Common to all such polyurethanes is that they are prepared by polyaddition reaction of polyamines or polyols with polyfunctional isocyanates. Through skilled selection of the polyamine and/or polyol component it is possible to tailor the profile of properties of the polyurethane obtained.

A disadvantage found is the high reactivity of the polyfunctional isocyanates, leading to a high sensitivity to moisture. While polyfunctional isocyanates can be stored for some considerable time under water-free conditions, the reaction with water occurs in the course of curing, hence necessitating very dry operation. Beyond the sensitivity to moisture, the aromatic isocyanates in particular tend toward discolorations. Another problem is the health concerns raised by certain diisocyanates. Thus it is known that diisocyanates may trigger allergies on skin contact or inhalation. For this reason, oligomers of diisocyanates have been developed that are easier to handle on account of their lower volatility. Nevertheless, there is a fundamental demand for alternatives to the polyisocyanates known from the prior art.

Alkylidene-1,3-dioxolan-2-ones, also referred to below as exo-vinylene carbonates, have been described at various points in the literature, as for example in DE 1098953, DE 3433403, EP 837062, JP 2006137733, JP 2008222619, J. Org. Chem. 2007, 72, 647-649, Angew. Chem. 2009, 121, 4258-4261, Eur. J. Org. Chem. 2007, 2604-2607, Eur. J. Org. Chem. 2008, 2309-2312, and Org. Lett. 2006, 8, 515-518. Alkylidene-1,3-dioxolan-2-ones are proposed therein as synthesis building blocks for the preparation of active ingredients and effect substances.

WO 2011/157671 describes the use of alkylidene-1,3-dioxolan-2-ones together with aminic hardeners as additives in epoxy resin compositions.

WO 96/26224 describes the copolymerization of 4-vinyl-1,3-dioxolan-2-ones with ethylenically unsaturated comonomers. The polymers obtained in this reaction have 1,3-dioxolan-2-one groups and are used together with aminofunctional crosslinkers for the production of coatings.

EP-B-1 448 619 disclose 4-(meth)acryloyloxyalkyl-1,3-dioxolan-2-ones which are polymerized with ethylenically unsaturated comonomers to form copolymers which have 1,3-dioxolane-2-one groups bonded via alkyloxycarbonyl units. The polymers are reacted with aminic compounds, giving graft polymers which have urethane groups and hydroxyl groups. The graft polymers are used in coating materials, more particularly clearcoats, which are cured by means of customary compounds having reactive groups, such as hydroxyl groups, amino groups, isocyanate groups, epoxy groups, silane groups, acetoacetate groups, vinyl groups, and acrylate groups, at elevated temperatures.

WO 2012/130718, moreover, discloses polymers based on (2-oxo-1,3-dioxolan-4-yl)methyl acrylate and (2-oxo-1,3-dioxolan-4-yl)methyl methacrylate, which are used together with diamines or polyamines in coating material compositions.

However, the reactivity of the polymers with 1,3-dioxolan-2-one groups that are known from the prior art is unsatisfactory, particularly in the context of the reaction with alcohols. In the reaction of 1,3-dioxolan-2-ones with, for example, amines or alcohols, moreover, hydroxyl groups are formed, which may prove disadvantageous in a variety of applications.

The as yet unpublished international patent application PCT/EP2013/056716 describes polymerizable alkylidene-1,3-dioxolan-2-one monomers, their preparation, and their use for producing the corresponding homopolymers or copolymers, and also the use thereof as crosslinker component in 2K [two-component] coating material compositions. For the crosslinking of these carbonate group-containing polymers, amino group-containing compounds, in particular, are used besides hydroxyl group-containing compounds. Alcoholic curing agents specified therein are alcohols such as propanediol, butanediol, pentanediol, hexanediol, ethylene glycol, diethylene and triethylene glycol, neopentyl glycol, glycerol, diglycerol, pentaerythritol, dipentaerythritol, and sugar alcohols such as sorbitol and mannitol, whereas hydroxyl group-containing compounds of higher molecular mass are not described.

OBJECT

It was an object of the present invention, therefore, to provide coating material compositions which for curing require no addition of polyisocyanates and no addition of melamine-formaldehyde resins. Furthermore, the coating material compositions ought to have a good reactivity, thus ensuring sufficient crosslinking of the resultant coating under the curing conditions customary in the automotive OEM finishing and automotive refinish segments and also in the segment of the finishing of commercial vehicles and of parts for installation in and on automobiles.

Furthermore, the coating material compositions ought to lead to coatings which have as little inherent coloring as possible—particularly in the case of overbaking. Furthermore, the coating material compositions ought also to meet the requirements typically imposed on the clearcoat film in automotive OEM finishing and automotive refinish.

Lastly, the coating material compositions ought to be able to be produced easily and extremely reproducibly, and ought not to give rise to any environmental problems during coating-material application.

ACHIEVEMENT OF THE OBJECT

In the light of the above-stated objective, nonaqueous coating material compositions have been found, comprising (A) at least one oligomeric and/or polymeric compound (A) having at least two hydroxyl groups, (B) at least one oligomeric and/or polymeric compound (B) having at least two alkylidene-1,3-dioxolan-2-one groups, and (D) at least one catalyst (D) for the crosslinking, wherein
the compound (B) contains at least two alkyliden-1,3-dioxolan-2-one groups of the formula (I')

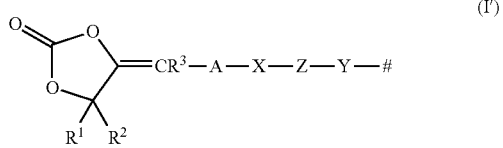

(I')

where # stands for the attachment to the polymer backbone and
$R^1$, $R^2$ independently of one another are hydrogen, $C_1$-$C_6$ alkyl, $C_1$-$C_4$ alkoxy-$C_1$-$C_4$ alkyl, $C_5$-$C_6$ cycloalkyl, phenyl or phenyl-$C_1$-$C_4$ alkyl;
$R^3$ is hydrogen, $C_1$-$C_6$ alkyl, $C_1$-$C_4$ alkoxy-$C_1$-$C_4$ alkyl, $C_5$-$C_6$ cycloalkyl, phenyl, or phenyl-$C_1$-$C_4$ alkyl, $R^3$ more particularly being hydrogen;
A is a chemical bond or $C_1$-$C_4$ alkanediyl, A more particularly being $C_1$-$C_4$ alkanediyl;
X is O or $NR^7$;
Z is a chemical bond, $PO_2$, $SO_2$, or C=O, Z more particularly being C=O;
Y is a chemical bond, $CH_2$, or $CHCH_3$, Y more particularly being a chemical bond; and
$R^7$ where present is $C_1$-$C_6$ alkyl.

The present invention additionally provides multistage coating methods using these coating material compositions, and also the use of the coating material compositions as clearcoat and application of the coating method for automotive OEM finishing, for automotive refinishing and/or for the coating of parts for installation in or on automobiles, of plastics substrates and/or of commercial vehicles.

It has now surprisingly been found that the compounds (B) which have at least two alkylidene-1,3-dioxolan-2-one groups of the formula (I') have a reactivity which is increased so markedly relative to the prior-art polymers with 1,3-dioxolan-2-one groups that with hydroxyl group-containing curing agents, under the curing conditions customary in the segment of automotive OEM finishing and OEM automotive refinish, and also in the segment of the finishing of parts for installation in or on automobiles, and commercial vehicles, they ensure sufficient crosslinking of the resultant coating.

A further feature of the coating material compositions of the invention is that for curing they require no addition of polyisocyanates and no addition of melamine-formaldehyde resins, and therefore that the environmental problems associated with these toxic and/or irritant compounds, particularly during coating-material application, can be avoided.

In addition, the coating material compositions lead to coatings which have an extremely slight inherent color—especially in the case of overbaking. Furthermore, the coating material compositions also meet the requirements typically imposed on the clearcoat film in automotive OEM finishing and automotive refinish.

Lastly, the coating material compositions can be produced easily and with very good reproducibility.

DESCRIPTION OF THE INVENTION

The Coating Materials of the Invention

For the purposes of the present invention, unless otherwise indicated, constant conditions were selected in each case for the determination of nonvolatile fractions (NVF, solids). To determine the nonvolatile fraction, an amount of 1 g of the respective sample is applied to a solid lid and heated at 130° C. for 1 h, then cooled to room temperature and weighed again (in accordance with ISO 3251). Determinations were made of the nonvolatile fraction of, for example, corresponding polymer solutions and/or resins present in the coating composition of the invention, in order thereby to adjust the weight fraction of the respective constituent in a mixture of two or more constituents, or of the overall coating composition, and allow it to be determined.

For the purposes of the invention, the hydroxyl number or OH number indicates the amount of potassium hydroxide, in milligrams, which is equivalent to the molar amount of acetic acid bound during the acetylation of one gram of the constituent in question. For the purposes of the present invention, unless otherwise indicated, the hydroxyl number is determined experimentally by titration in accordance with DIN 53240-2 (Determination of hydroxyl value—Part 2: Method with catalyst).

For the purposes of the invention, the acid number indicates the amount of potassium hydroxide, in milligrams, which is needed to neutralize 1 g of the respective constituent. For the purposes of the present invention, unless otherwise indicated, the acid number is determined experimentally by titration in accordance with DIN EN ISO 2114.

The mass-average (Mw) and number-average (Mn) molecular weight is determined for the purposes of the present invention by means of gel permeation chromatography at 35° C., using a high-performance liquid chromatography pump and a refractive index detector. The eluent used was tetrahydrofuran containing 0.1 vol % acetic acid, with an elution rate of 1 ml/min. The calibration is carried out by means of polystyrene standards.

For the purposes of the invention, the glass transition temperature Tg is determined experimentally on the basis of DIN 51005 "Thermal Analysis (TA)—Terms" and DIN 53765 "Thermal Analysis—Differential Scanning Calorimetry (DSC)". This involves weighing out a 10 mg sample into a sample boat and introducing it into a DSC instrument. The instrument is cooled to the start temperature, after which a $1^{st}$ and $2^{nd}$ measurement run is carried out under inert gas flushing ($N_2$) at 50 ml/min with a heating rate of 10 K/min, with cooling to the start temperature again between the measurement runs. Measurement takes place typically in the temperature range from about 50° C. lower than the expected glass transition temperature to about 50° C. higher than the glass transition temperature. The glass transition temperature recorded for the purposes of the present invention, in line with DIN 53765, section 8.1, is the temperature in the $2^{nd}$ measurement run at which half of the change in the specific heat capacity (0.5 delta cp) is reached. This temperature is determined from the DSC plot (plot of the thermal flow against the temperature), and is the temperature at the point of intersection of the midline between the extrapolated base lines, before and after the glass transition, with the measurement plot.

The crosslinking onset temperature of the binder mixtures (A) plus (B) plus optionally (C) plus catalyst (D) is determined experimentally for the purposes of the invention, by means of Dynamic-Mechanical Analysis (DMA). This method is described, for example, in DIN EN ISO 6721-1, the method in this standard being elucidated in the context of determination of dynamic mechanical properties of plastics. In DMA, an oscillating force is applied to the sample for the purpose of detecting, as a function of frequency and of temperature, the viscoelastic properties of the sample (i.e., the stiffness, expressed by the measured storage modulus E', and the work dissipated per swing, expressed by the measured loss modulus E"). The stiffer a material, the greater the amount of the storage modulus—that is, the material presents a greater resistance to its elastic deformation. For a composition of crosslinkable polymer chains, as for example the binder mixture (A), (B), optionally (C), and (D) of the invention, the stiffness rises when the individual polymer chains begin to crosslink with one another and thus a complex network or a film is formed from a mixture of individual polymer chains. For the purposes of the present invention, the storage modulus is determined by DMA, by loading the sample with a sinusoidal vibration of constant amplitude and frequency while continuously raising the temperature. The temperature at which the storage modulus begins to climb is identified for the purposes of the present invention as the crosslinking onset temperature of the binder mixture. The measurements were carried out using a Triton 2000D instrument from Triton Technology. In this case, 1 g of the respective binder mixtures for measurement of (A) plus (B) plus optionally (C) plus catalyst (D) (solids 50%, adjusted with butyl acetate), to a glass fiber mesh that is clamped into the measuring instrument, and the storage modulus E' is measured with continuous temperature increase of 2° C. per minute under sinusoidal sample loading (constant frequency, constant amplitude in the linear measurement range). The measurement takes place usually in a temperature range relevant to the sample, of around 2 to 200° C. The crosslinking onset temperature is then determined by graph from the storage modulus/temperature diagram, and is the temperature of the point of intersection of the extrapolated baseline of the storage modulus before the onset of crosslinking, and the extrapolated straight line resulting from the quasilinear ascending range of the storage modulus after the onset of crosslinking. In this way, the crosslinking onset temperature can be determined readily to an accuracy of +/−2° C.

The Polyhydroxyl Group-Containing Compound (A)

As polyhydroxyl group-containing compound (A) it is possible to use all compounds known to the skilled person which have at least two hydroxyl groups per molecule and are oligomeric and/or polymeric. As component (A) it is also possible to use mixtures of different oligomeric and/or polymeric polyols.

The preferred oligomeric and/or polymeric polyols (A) have number-average molecular weights Mn>=300 daltons, preferably Mn=400-30 000 daltons, more preferably Mn=500-15 000 daltons, and mass-average molecular weights Mw>500 daltons, preferably between 800 and 100 000 daltons, more particularly between 900 and 50 000 daltons, measured by means of gel permeation chromatography (GPC) against a polystyrene standard.

Preferred are polyester polyols, polyacrylate polyols and/or polymethacrylate polyols, and also copolymers thereof—referred to hereinafter as polyacrylate polyols; polyurethane polyols, polysiloxane polyols, and mixtures of these polyols.

The polyols (A) preferably have an OH number of 30 to 400 mg KOH/g, more particularly between 70 and 300 mg KOH/g. In the case of the poly(meth)acrylate copolymers, the OH number may also be determined with sufficient precision by calculation on the basis of the OH-functional monomers employed.

The polyols (A) preferably have an acid number of between 0 and 30 mg KOH/g. Since surprising it has been found that the lower the acid number of the polyol (A), the lower the temperature at which the crosslinking reaction commences (onset temperature), use is made more particularly of polyols (A) which have an acid number of between 0 and 10 mg KOH/g, preferably between 0 and 5 mg KOH/g, and very preferably of less than 1 mg KOH/g.

The glass transition temperatures, measured by means of DSC measurements in accordance with DIN-EN-ISO 11357-2, of the polyols are preferably between −150 and 100° C., more preferably between −120° C. and 80° C.

Polyurethane polyols are prepared preferably by reaction of oligomeric polyols, more particularly of polyester polyol prepolymers, with suitable di- or polyisocyanates, and are described in EP-A-1 273 640, for example. Use is made more particularly of reaction products of polyester polyols with aliphatic and/or cycloaliphatic di- and/or polyisocyanates.

The polyurethane polyols used with preference in accordance with the invention have a number-average molecular weight Mn>=300 daltons, preferably Mn=700-2000 daltons, more preferably Mn=700-1300 daltons, and also preferably a mass-average molecular weight Mw>500 daltons, preferably between 1500 and 3000 daltons, more particularly between 1500 and 2700 daltons, in each case measured by means of gel permeation chromatography (GPC) against a polystyrene standard.

Suitable polysiloxane polyols are described in WO-A-01/09260, for example, and the polysiloxane polyols recited therein can be employed preferably in combination with further polyols, more particularly those having relatively high glass transition temperatures.

As polyhydroxyl group-containing compound (A), use is made with particular preference of polyester polyols, polyacrylate polyols, polymethacrylate polyols, polyurethane polyols, or mixtures thereof, and very preferably of polyester polyols or of mixtures of polyester polyols with poly (meth)acrylate polyols.

The polyester polyols used with preference in accordance with the invention have a number-average molecular weight Mn>=300 daltons, preferably Mn=400-10 000 daltons, more preferably Mn=500-5000 daltons, and also preferably a mass-average molecular weight Mw>500 daltons, preferably between 800 and 50 000 daltons, more particularly between 900 and 10 000 daltons, in each case measured by means of gel permeation chromatography (GPC) against a polystyrene standard.

The polyester polyols used with preference in accordance with the invention preferably have an OH number of 30 to 400 mg KOH/g, more particularly between 100 and 300 mg KOH/g.

The polyester polyols (A) used with preference in accordance with the invention preferably have an acid number of between 0 and 30 mg KOH/g. Since surprisingly it has been found that the lower the acid number of the polyol (A), the lower the temperature at which the crosslinking reaction commences (onset temperature), use is made more particularly of polyester polyols (A) which have an acid number of between 0 and 25 mg KOH/g, preferably between 0 and 5 mg KOH/g, and very preferably of less than 1 mg KOH/g.

A polyester, generally speaking, is a polymeric organic compound which is prepared using polyhydric organic polyols and polybasic organic carboxylic acids. These polyols and polycarboxylic acids are linked to one another by esterification, in other words by condensation reactions. Accordingly, the polyesters are generally assigned to the group of the polycondensation resins. Depending on the nature, functionality, proportions employed, and ratios of the starting components, for example, linear or branched products are obtained. While linear products come about primarily when using difunctional starting components (diols, dicarboxylic acids), branching is achieved through the use, for example, of higher polyfunctional alcohols (with an OH functionality, i.e., number of OH groups per molecule, of more than 2). Also possible in the preparation, of course, is the proportional use of monofunctional components, such as monocarboxylic acids, for example. As is known, the polyesters may also be prepared using the anhydrides of the carboxylic acids instead of or in addition to the corresponding organic carboxylic acids, and more particularly using the anhydrides of the dicarboxylic acids. Likewise possible is the preparation through the use of hydroxycarboxylic acids or of lactones derived from the hydroxycarboxylic acids by intramolecular esterification.

Fully generally, in the preparation of polyesters, it is possible to employ polycarboxylic acids and polyols, examples being aliphatic polycarboxylic acids and aliphatic polyols.

Aliphatic compounds are, as is known, acyclic or cyclic hydrocarbon compounds which are saturated or unsaturated. The term "aliphatic compound" therefore encompasses acyclic and cyclic aliphatics and is also valid as a corresponding generic term in the context of the present invention. For the purposes of the present invention, the noncyclic aliphatics are referred to as acyclic aliphatics, and the cyclic aliphatics as cycloaliphatics. The acyclic aliphatics may be linear or branched. Linear means, as is known, that the compound in question has no branching in terms of the carbon chain, but that, instead, the carbon atoms are arranged exclusively in linear sequence in a chain. Branched or nonlinear therefore means, for the purposes of the present invention, that the particular compound under consideration has branching in the carbon chain—that is, at least one carbon atom in the respective compound is a tertiary carbon atom. Cycloaliphatics are, as is known, those compounds in which at least some of the carbon atoms present are linked in the molecule in such a way as to form one or more rings. In addition to the one or more rings, of course, there may be other acyclic linear or branched aliphatic groups present.

The term "aliphatic polycarboxylic acid" is applied, therefore, to those polycarboxylic acids which in addition to their carboxylic acid groups have aliphatic groups, i.e., consist of carboxylic acid groups and aliphatic groups. This form of the term is also valid for all other classes of compound identified in the context of the present invention, examples being the polyols already stated.

Likewise possible is the use of aromatic polycarboxylic acids and aromatic polyols, or else of polycarboxylic acids and polyols which as well as the functional groups that identify their class of compound have both (linear, branched and/or cyclic) aliphatic and aromatic groups. Also possible is the use of linear, branched and/or cyclic aliphatic and/or aromatic hydroxycarboxylic acids and also lactones—that is, then, hydroxycarboxylic acids and lactones which in addition to the functional groups identifying their class of compound, have linear, branched and/or cyclic aliphatic and/or aromatic groups.

Suitable diols are, for example, glycols such as ethylene glycol, propylene glycol, butylene glycol, butane-1,4-diol, hexane-1,6-diol, neopentyl glycol, and other diols, such as 1,4-dimethylolcyclohexane or 2-butyl-2-ethyl-1,3-propanediol. When the polyester used in accordance with the invention comprises diols as synthesis components, the stated diols are preferably the only diols present.

Suitable higher polyfunctional alcohols (OH functionality greater than 2) are, for example, trimethylolpropane, glycerol, pentaerythritol, dipentaerythritol, and tris(2-hydroxyethyl)-isocyanurate. The stated higher polyfunctional alcohols are preferably the only higher polyfunctional alcohols present. With particular preference the polyester used in accordance with the invention comprises tris(2-hydroxyethyl)isocyanurate and/or pentaerythritol.

The acid component of a polyester generally comprises dicarboxylic acids or their anhydrides with 2 to 44, preferably 4 to 36, carbon atoms in the molecule. Examples of suitable acids are o-phthalic acid, isophthalic acid, terephthalic acid, tetrahydrophthalic acid, cylcohexanecarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. In place of these acids it is also possible to use their anhydrides, where they exist.

Use may also be made of higher polyfunctional carboxylic acids, having 3 or more carboxyl groups (and/or the corresponding anhydrides) an example being trimellitic anhydride.

It is also possible optionally to make proportional use of monocarboxylic acids, such as unsaturated fatty acids, for example. It is likewise possible, proportionally, to use glycidyl esters of saturated aliphatic monocarboxylic acids in which the carboxyl group is bonded to a tertiary C atom. Contemplated more particularly here is the glycidyl ester of Versatic acid. This ester is available commercially, for example, under the Cardura® E10 designation. These glycidyl esters of saturated aliphatic monocarboxylic acids are used more particularly to lower the acid number of the polyester polyols (A) used in accordance with the invention. The acid number of the polyester polyols (A) used in accordance with the invention may likewise be lowered in a manner known to the skilled person by reaction of the residual carboxyl groups with other monofunctional compounds that are reactive with carboxyl groups, such as, for example, other epoxy compounds, alcohols, or amines.

Examples of hydroxycarboxylic acids which can be used are hydroxycaproic acid, hydroxybutyric acid, hydroxydecanoic acid and/or 12-hydroxystearic acid. Lactones which can be used are, for example, the beta-, gamma-, delta-, and epsilon-lactones that are known per se.

As well as the monomeric compounds described above it is also possible, for example, to use starting products that are already polymeric, examples, as diols, being the polyester diols that are known per se and are obtained by reaction of a lactone with a dihydric alcohol.

The polyester (A) used in accordance with the invention comprises with particular preference, as synthesis components, tris(2-hydroxyethyl)isocyanurate and/or pentaerythritol, the anhydride of a cycloaliphatic dicarboxylic acid and/or the anhydride of an aromatic dicarboxylic acid and/or the glycidyl ester of Versatic acid.

The preparation of polyesters has no procedural peculiarities and is generally accomplished using the polymerization processes, more particularly polycondensation processes, that are customary per se and known, as for example in bulk or in solution at temperatures of preferably 50 to 300° C., with optional use of the catalysts typical for such processes, such as, for example, acids (concentrated sulfuric acid, for example), dibutyltin laurate, or other tin-based catalysts available, for example, under the trade name Fascat (for example, Fascat 4100). The water produced from the condensation reaction is typically removed by means of a water separator.

Suitable polyester polyols are also described in EP-A-0 994 117 and EP-A-1 273 640, for example.

The poly(meth)acrylate polyols used in accordance with the invention are generally copolymers and preferably have a number-average molecular weight Mn>=300 daltons, preferably Mn=500-15 000 daltons, more preferably Mn=900-10 000 daltons, and also, preferably, mass-average molecular weights Mw between 500 and 20 000 daltons, more particularly between 1000 and 15 000 daltons, measured in each case by means of gel permeation chromatography (GPC) against a polystyrene standard.

The glass transition temperature of the copolymers is generally between −100 and 100° C., more particularly between −60 and <20° C. (measured by means of DSC measurements in accordance with DIN-EN-ISO 11357-2).

The poly(meth)acrylate polyols preferably have an OH number of 60 to 300 mg KOH/g, more particularly between 70 and 200 mg KOH/g, and an acid number of between 0 and 30 mg KOH/g.

The hydroxyl number (OH number) and the acid number are determined as described above (DIN 53240-2 and DIN EN ISO 2114).

Hydroxyl group-containing monomer building blocks used are preferably hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and also, in particular, 4-hydroxybutyl acrylate and/or 4-hydroxybutyl methacrylate.

Further monomer building blocks used for the poly(meth)acrylate polyols are preferably alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or, in particular, cyclohexyl acrylate and/or cyclohexyl methacrylate.

As further monomer building blocks for the poly(meth)acrylate polyols it is possible to use vinylaromatic hydrocarbons, such as vinyltoluene, alpha-methylstyrene, or, in particular, styrene, amides or nitriles of acrylic or methacrylic acid, vinyl esters or vinyl ethers, and also, in minor amounts, in particular, acrylic acid and/or methacrylic acid.

The coating material of the invention preferably comprises from 10 to 69.99 wt %, preferably from 20 to 59.9 wt %, of
at least one hydroxyl-containing polyester (A) or
at least one hydroxyl-containing poly(meth)acrylate (A) or
at least one hydroxyl-containing polyurethane (A) or
a mixture of at least one hydroxyl-containing polyester (A) and at least one hydroxyl-containing poly(meth)acrylate (A) or
a mixture of at least one hydroxyl-containing polyester (A) and at least one hydroxyl-containing polyurethane (A), or
a mixture of at least one hydroxyl-containing poly(meth)acrylate (A) and at least one hydroxyl-containing polyurethane (A), or
a mixture of at least one hydroxyl-containing polyester (A) and at least one hydroxyl-containing poly(meth)acrylate (A) and at least one hydroxyl-containing polyurethane (A), the quantity figures being based in each case on the binder fraction of the coating material [in other words based on the total weight of the binder fraction of the compounds (B) of the invention with functional groups of the formula I', plus the binder fraction of the polyol (A), plus the binder fraction of component (C), plus weight of the catalyst (D)].

Hydroxyl-containing Compounds (C)

In addition to the polyhydroxyl group-containing component (A), the coating material compositions of the invention may optionally further comprise one or more monomeric, hydroxyl-containing compounds (C), which are different from component (A). These compounds (C) preferably account for a fraction of 0 to 20 wt %, more preferably of 0 to 10 wt %, based in each case on the binder fraction of the coating material [in other words based on the total weight of the binder fraction of the compounds (B) of the invention with functional groups of the formula I', plus the binder fraction of the polyol (A), plus the binder fraction of component (C), plus weight of the catalyst (D)].

Low molecular mass polyols are employed as hydroxyl-containing compound (C).

Low molecular mass polyols used are, for example, diols, such as preferably ethylene glycol, di- and triethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as preferably trimethylolethane, trimethylolpropane, trimethylolhexane, 1,2,4-butanetriol, pentaerythritol, and dipentaerythritol. Such low molecular mass polyols are preferably admixed in minor fractions to the polyol component (A).

The Compounds (B) Having at Least Two Alkylidene-1,3-dioxolan-2-one Groups of the Formula (I')

It is essential to the invention that the compounds (B) used in accordance with the invention contain at least two alkylidene-1,3-dioxolan-2-one groups of the formula (I'):

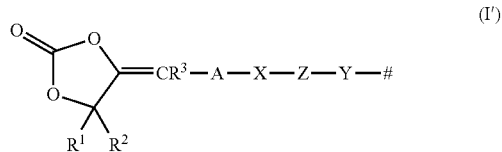

where # stands for the attachment to the polymer backbone and
$R^1$, $R^2$ independently of one another are hydrogen, $C_1$-$C_6$ alkyl, $C_1$-$C_4$ alkoxy-$C_1$-$C_4$ alkyl, $C_5$-$C_6$ cycloalkyl, phenyl or phenyl-$C_1$-$C_4$ alkyl;
$R^3$ is hydrogen, $C_1$-$C_6$ alkyl, $C_1$-$C_4$ alkoxy-$C_1$-$C_4$ alkyl, $C_5$-$C_6$ cycloalkyl, phenyl, or phenyl-$C_1$-$C_4$ alkyl, $R^3$ more particularly being hydrogen;
A is a chemical bond or $C_1$-$C_4$ alkanediyl, A more particularly being $C_1$-$C_4$ alkanediyl;
X is O or $NR^7$;
Z is a chemical bond, $PO_2$, $SO_2$, or C=O, Z more particularly being C=O;
Y is a chemical bond, $CH_2$, or $CHCH_3$, Y more particularly being a chemical bond; and
$R^7$ where present is $C_1$-$C_6$ alkyl.

In combination with the hydroxyl-containing compounds (A), such compounds (B) have a high reactivity, without possessing the disadvantages associated with isocyanates. They are therefore particularly suitable as replacements for polyfunctional isocyanates in numerous applications, more particularly for coating material compositions for automotive OEM finishing, for automotive refinish, and for the coating of parts for installation in or on vehicles, and of plastics.

It has surprisingly been found that the compounds (B), described in more detail below, can be prepared by polymerization using ethylenically unsaturated monomers which have an alkylidene-1,3-dioxolane-2-one group and a further ethylenically unsaturated double bond, with retention of the alkylidene-1,3-dioxolan-2-one group. This is surprising since at various points in the literature it is described how the methylene group in methylene-1,3-dioxolan-2-ones undergoes polymerization under radical conditions—see, for example, Journal of Network Polymer, Japan 2005, 26, 132-137, Makromol. Chem., Rapid Commun. 1989, 10, 453-456.

Here and below, the prefix "$C_n$-$C_m$" used for defining substituents and chemical compounds indicates the number of possible C atoms in the substituent or compound, respectively.

Unless indicated otherwise, the following general definitions are valid, for the purposes of the present invention, for the terms used in connection with the substituents:

"Alkyl" stands for a linear or branched alkyl radical having for example 1 to 4 ($C_1$-$C_4$ alkyl), 1 to 6 ($C_1$-$C_6$ alkyl), or 1 to 20 carbon atoms ($C_1$-$C_{20}$ alkyl). Examples of $C_1$-$C_4$ alkyl are methyl, ethyl, n-propyl, isopropyl, n-butyl, 2-butyl, isobutyl and tert-butyl (2-methylpropan-2-yl). Examples of $C_1$-$C_6$ alkyl, in addition to the definitions stated for $C_1$-$C_4$ alkyl, are also n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. Examples of $C_1$-$C_{20}$ alkyl, in addition to the definitions stated for $C_1$-$C_6$ alkyl, are also heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, and their constitutional isomers.

"$C_1$-$C_4$ Alkoxy-$C_1$-$C_4$ alkyl" stands for an alkyl group which has 1 to 4 carbon atoms and is bonded via an oxygen atom, such as, for example, methoxy, ethoxy, n-propoxy, 1-methylethoxy (isopropoxy), n-butoxy, 1-methylpropoxy (sec-butoxy), 2-methylpropoxy (isobutoxy) or 1,1-dimethylethoxy (tert-butoxy), which is bonded in the form of an ether bond via the oxygen to a $C_1$-$C_4$ alkyl group as defined above. Examples are methoxymethyl, 2-methoxyethyl, ethoxymethyl, 3-methoxy-propyl, and 3-ethoxypropyl.

"$C_5$-$C_6$ Cycloalkyl" stands for a cyclic alkyl radical having 5 to 6 carbon atoms. Examples are cyclopentyl and cyclohexyl.

"Phenyl-$C_1$-$C_4$ alkyl" stands for a phenyl group which is bonded to a $C_1$-$C_4$ alkyl group as defined above. Examples are benzyl, phenylethyl, phenylpropyl, and phenylbutyl.

"$C_1$-$C_4$ Alkanediyl" stands for an alkanediyl having 1 to 4 carbon atoms. Examples are methanediyl, 1,1-ethanediyl, 1,2-ethanediyl, 1-methyl-1,1-ethanediyl, 1-methyl-1,2-ethanediyl, 1,3-propanediyl, 1,4-butanediyl, 1,1-dimethyl-1,2-ethanediyl, and 1,2-dimethyl-1,2-ethanediyl.

"$C_1$-$C_8$ Alkoxy" stands for an alkoxy group which has 1 to 8 carbon atoms and is bonded via an oxygen atom. Examples are methoxy, ethoxy, n-propoxy, 1-methylethoxy (isopropoxy), n-butoxy, 1-methylpropoxy (sec-butoxy), 2-methylpropoxy (isobutoxy), 1,1-dimethylethoxy (tert-butoxy), n-pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, 2-ethylpropoxy, n-hexoxy, 1-methylpentoxy, 2-methylpentoxy, 3-methylpentoxy, 4-methylpentoxy, 1-ethylbutoxy, 2-ethylbutoxy, 3-ethylbutoxy, 1,2-dimethylbutoxy, 1,3-dimethylbutoxy, 2,3-dimethylbutoxy, 1-ethyl-2-methylpropoxy, and 1-isopropylpropoxy.

"$C_1$-$C_4$ Alkylcarbonyl", stands for a $C_1$-$C_4$ alkyl radical as defined above that is bonded via a carbonyl group—for example, for acetyl, propionyl, butyryl, pivaloyl, etc.

With regard to preferred embodiments of the invention, the radicals or groups $R^1$, $R^2$, $R^3$, $R^4$, $R^5$, $R^6$, $R^7$, $R^8$, A, X, Z, and Y in the compounds of the formula I and in the groups of the formula I' preferably have, independently of one another, one or more, or all, of the following definitions:

$R^1$ stands for hydrogen or $C_1$-$C_6$ alkyl, more particularly for hydrogen or $C_1$-$C_4$ alkyl, and especially for methyl or ethyl;

$R^2$ stands for hydrogen or $C_1$-$C_6$ alkyl, more particularly for $C_1$-$C_4$ alkyl, and especially for methyl or ethyl;

$R^3$ stands for hydrogen;

A stands for $C_1$-$C_4$ alkanediyl, more particularly for methanediyl, 1,2-ethanediyl, or 1,3-propanediyl, more preferably 1,2-ethanediyl;

X stands for O;

Z stands for C=O;

Y stands for a chemical bond;

$R^4$ stands for hydrogen or $C_1$-$C_4$ alkyl, more particularly for hydrogen or methyl;

$R^5$ stands for hydrogen;

$R^6$ stands for hydrogen;

$R^7$ where present stands for $C_1$-$C_4$ alkyl;

$R^8$ where present stands for $C_1$-$C_4$ alkyl.

The compounds of the formula I are prepared in general by the process elucidated in more detail hereinafter, in which a compound of the general formula II is reacted with a compound of the general formula III:

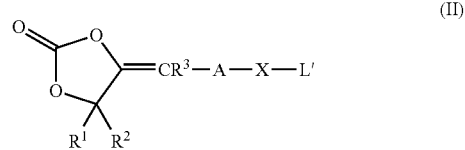

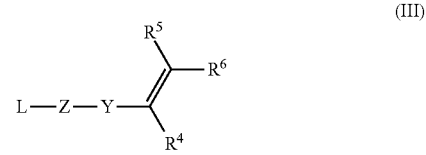

In formula II, L' stands for hydrogen or a hydroxyl-protecting or amino-protecting group, such as a $C_1$-$C_4$ alkylcarbonyl group, for example. The variables A, X, $R^1$, $R^2$, and $R^3$ have the definitions stated above, more particularly those definitions stated as being preferred.

In formula III, L is a nucleophilically displaceable leaving group, examples being halogen, OH or $C_1$-$C_8$ alkoxy. The variables Y, Z, $R^4$, $R^5$, and $R^6$ have the definitions stated above, more particularly the definitions stated as being preferred.

The reaction of the compounds of the formulae II and III can be carried out in analogy to known processes of nucleophilic substitution. Where L' is a hydroxyl-protecting or amino-protecting group, this protecting group is generally removed prior to the reaction of compound II with compound III, or reaction conditions are selected under which the protecting group is eliminated, so that the actual reactant is the compound of the formula II in which L' stands for hydrogen.

In accordance with one preferred embodiment of the invention, in formula III, the variable Z stands for C=O and the variable L stands for OH or $C_1$-$C_8$ alkoxy. In this case, the reaction of compound III with compound II, optionally following the removal of the hydroxyl-protecting or amino-protecting group, is accomplished as an amidation or esterification or transesterification reaction.

Especially suitable is the esterification or transesterification for the preparation of compounds of the formula I in which Z is C=O and X is O, A is $C_1$-$C_4$ alkanediyl, $R^4$ is hydrogen or $C_1$-$C_4$ alkyl, especially hydrogen or methyl, and $R^5$ and $R^6$ are hydrogen. In this case, preferred reactants of the formula III are selected from the $C_1$-$C_8$ alkyl esters of acrylic acid and of methacrylic acid, hereinafter (meth) acrylic acid $C_1$-$C_8$ alkyl esters, examples being methyl, ethyl, n-butyl and 2-ethylhexyl (meth)acrylates, and very preferably (meth)acrylic acid $C_1$-$C_4$ alkyl esters, examples being methyl, ethyl, and n-butyl (meth)acrylates.

According to one particularly preferred embodiment of the invention, in formula III, the variable L stands for OH or $C_1$-$C_8$ alkoxy, the variable Z stands for C=O, and, in formula II, the variable X stands for O, and the reaction of compound II with compound III is carried out under the conditions of an esterification or transesterification. In one specific configuration of this embodiment, L' in formula II stands for hydrogen or a $C_1$-$C_4$ alkylcarbonyl group, especially an acetyl group.

In one preferred embodiment the compounds of the formula I are prepared by esterification or transesterification with enzyme catalysis.

The enzyme-catalyzed esterification or transesterification may be carried out in analogy to the methods described in Biotechnol. Lett. 1990, 12, 825-830, Biotechnol. Lett. 1994, 16, 241-246, U.S. Pat. No. 5,240,835, WO 2004/05088, or DE 102009003035, hereby incorporated in full by reference.

Enzymes (E) which can be used for the enzyme-catalyzed esterification or transesterification are selected, for example, from hydrolases, esterases (E.C. 3.1.-.-), lipases (E.C. 3.1.1.3), glycosylases (E.C. 3.2.-.-), and proteases (E.C. 3.4.-.-), in free form or in a form immobilized physically or chemically on a support, preferably lipases, esterases, or proteases. Particularly preferred are Novozym® 435 from Novozymes (lipase from *Candida antarctica* B) or lipase from *Aspergillus* sp., *Aspergillus niger* sp., *Mucor* sp., *Penicillium cyclopium* sp., *Geotricum candidum* sp., *Rhizopus javanicus*, *Burkholderia* sp., *Candida* sp., *Pseudomonas* sp., or pig pancreas; especially preferred are lipases from *Candida antarctica* B or from 5 *Burkholderia* sp.

The enzyme content of the reaction medium is generally in the range from about 0.1 to 10 wt %, based on the sum of the reactants of the formula II and III that are employed.

The compounds of the formula I may also be prepared by conventional esterification or transesterification under the reaction conditions, customary for these reactions, of an acid-catalyzed esterification or of an acid-catalyzed or base-catalyzed transesterification.

Particularly suitable acidic catalysts for an acid-catalyzed esterification are protic acids, such as sulfuric acid, sodium hydrogensulfate, hydrochloric acid, phosphoric acid, monosodium dihydrogenphosphate, disodium hydrogenphosphate, pyrophosphoric acid, phosphorous acid, hypophosphorous acid, methanesulfonic acid, trifluoromethanesulfonic acid, p-toluenesulfonic acid, and mixtures thereof. Also suitable are Lewis acids such as Ti compounds and Sn compounds, for example. Additionally suitable are acidic ion exchanger resins, examples being sulfonated or carboxylated ion exchanger resins, in each case in their acidic form.

Suitable basic catalysts for a transesterification are metal hydroxides and/or metal alkoxides, more particularly those of metals from groups 1, 2, and 13 of the Periodic Table, examples being alkali metal hydroxides such as NaOH or KOH, and also alkali metal and alkaline earth metal alkoxides, more particularly the corresponding methoxides or ethoxides such as sodium or potassium methoxide or sodium or potassium ethoxide. Additionally suitable are ion exchange resins.

The acidic or basic catalysts are used generally in a concentration of 0.0001 wt % to 20 wt %, preferably 0.001 wt % to 10 wt %, based on the overall reaction mixture.

The esterification or transesterification reaction of II with III may be configured for example as a batch process. In that case, generally, the compounds of the formulae II and III will be introduced into a reaction vessel and reacted with one another with addition of the catalyst and/or the enzyme. Alternatively the esterification or transesterification reaction can be configured as a semibatch process. For that purpose, one of the reactants, the compound II or compound III for example, and also the catalyst and/or the enzyme, can be introduced as an initial charge, and the other reactants can be supplied in the course of the reaction. Furthermore, the compound of the formula I can be prepared by continuous reaction of the compound II with the compound III. For this purpose, for example, the compounds II and III will be supplied continuously to a reaction zone containing the catalyst, and the compound of the formula I, optionally together with the co-products formed during the reaction, alcohol or ester, for example, will be removed continuously from the reaction zone. The catalyst and/or the enzyme will optionally likewise be supplied to the reaction zone. In the case both of semibatch and of continuous reaction, the reactants, i.e., the compounds of the formulae II and III, can be passed, preferably in liquid phase, through a reaction zone which contains the catalyst and/or the enzyme as a stationary phase.

The reaction time is dependent on factors including the temperature, the amount used and the activity of the acidic, basic, or enzymic catalyst, and the required conversion, and also on the structure of the compound II. The reaction time is adapted preferably such that the conversion of the compound II is at least 70%, preferably at least 80%, more preferably at least 90%, very preferably at least 95%, and more particularly at least 97%. For this purpose, generally, 1 to 48 hours are sufficient, preferably 1 to 12 hours, and more preferably 1 to 6 hours.

The enzyme-catalyzed or conventionally catalyzed esterification or transesterification takes place in general at temperatures in the range from 0 to 100° C., preferably 20 to 80° C., more preferably 20 to 70° C.

The molar ratio of compound II to compound III can be varied within a wide range. The compound III is preferably used in excess relative to the stoichiometry of the reaction. In general the molar ratio of compound II to compound III is in the range from 1:100 to 1:1, preferably 1:50 to 1:1, more preferably 1:20 to 1:1. The compound of the formula III is present preferably in excess, and so can be distilled off together with the liberated co-product, generally an alcohol or the ester co-product that is formed in the case of a transesterification (if X-L' in the formula II is alkylcarbonyloxy and Y-L in formula III is alkoxycarbonyl), under reduced pressure, in the form of an azeotrope, for example. Additionally or alternatively, the liberated water or the alcohol or the ester can be bound using molecular sieve, for example. In this way the reaction equilibrium is shifted in favor of the compound of the formula I.

The enzyme-catalyzed and also the conventionally catalyzed esterification or transesterification can be carried out in organic solvents or mixtures thereof or without addition of solvents. The reaction mixtures are generally largely anhydrous (i.e., water content below 10 vol %, preferably below 5 vol %, more preferably below 1 vol %).

The fraction of organic solvents in the reaction mixture may for example be 0.1 to 50 wt % and, if a solvent is used, is preferably in the range from 0.5 to 30 wt % or in the range from 1 to 10 wt %. It is preferred for no, or less than 1 wt % of, organic solvent to be added to the enzymatically or conventionally catalyzed esterification or transesterification.

The compound I can be prepared in the presence of at least one polymerization inhibitor. Polymerization inhibitors that can be used include, for example, 4-methoxyphenol (MeHQ), hydroquinone, 2,5-di-tert-butylhydroquinone, 2,6-di-tert-butyl-p-cresol, nitroso compounds such as isoacryl nitrate, nitrosodiphenylamine, N-nitrosocyclohexylhydroxylamine, methylene blue, phenothiazine, or diphenylamine. Use of 4-methoxyphenol (MeHQ) as polymerization inhibitor is preferred.

The polymerization inhibitors are used generally, based on the amount of the compounds of the formula III, at from 1 to 10 000 ppm, preferably from 10 to 5000 ppm, more preferably from 30 to 2500 ppm, and more particularly from 50 to 1500 ppm.

The compounds of the formula III are known and are in general available commercially.

The compounds of the formula II can be prepared in analogy to known processes for preparing alkylidene-1,3-dioxolan-2-ones, as are described in the prior art cited at the outset, for example. Preferred compounds of the formula IT, in which $R^3$ is hydrogen, can be prepared, for example by reaction of the compound of the formula IV with $CO_2$, preferably using a catalyst (see scheme 1):

Scheme 1. Preparation of compounds of the formula IIa.

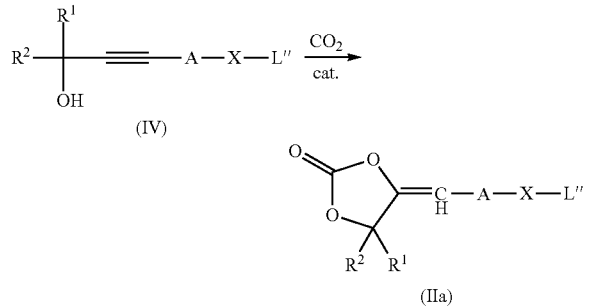

In Scheme 1, $R^1$, $R^2$, A, and X have the definitions stated above. L" stands for an alcohol-protecting or amino-protecting group, and more particularly for $C_1$-$C_4$ alkylcarbonyl, especially for acetyl. X stands in particular for oxygen. A stands in particular for $C_1$-$C_4$ alkanediyl.

Suitable catalysts are in principle transition metal catalysts comprising as active metal, for example, silver, copper, gold, palladium or platinum, examples being silver salts such as silver acetate, silver carbonate, and copper(II) salts such as copper acetate, or copper(I) halides such as CuI, CuBr, and CuCl, and also palladium(0) catalysts, it being possible for the aforementioned transition metal compounds to be used optionally in combination with an organic amine, as for example a tri-$C_1$-$C_6$ alkylamine such as triethylamine or an amidine base such as 1,5-diazabicyclo[4.3.0]non-5-ene (DBN) or 1,8-diazabicyclo[5.4.0]undec-7-ene (DBU), or with an organic phosphine, examples being trialkylphosphines or triarylphosphines such as tributylphosphine and triphenylphosphine, or in combination with a mixture of one of these aforementioned phosphines with an ammonium salt, such as, for example, tri-$C_1$-$C_6$ alkylammonium halides or tetra-$C_1$-$C_6$ alkylammonium halides. Further catalysts contemplated include organic phosphines as such, such as trialkylphosphines or triarylphosphines such as tributylphosphine or triphenylphosphine, and also sterically hindered carbenes, such as 1,3-substituted 2,3-dihydroimidazol-2-ylidene compounds such as 1,3-diisopropyl-2,3-dihydro-4,5-imidazol-2-ylidene or $CO_2$ adducts thereof, and also combinations of these with the aforementioned phosphines. The reaction can be carried out unpressurized or, preferably, under elevated pressure, such as at 50 to 500 bar, for example, or in supercritical $CO_2$. For the reaction conditions, refer to the literature identified above.

In place of $CO_2$ it is also possible to use a carboxylic anhydride such as, for example, bis(tert-butyl)dicarbonic anhydride ($Boc_2O$). In this case the reaction takes place usually in two stages, where in the first stage the compound IV is reacted with an ester of the biscarbonic anhydride, such as with $Boc_2O$, for example, in the presence of a base, sodium hydride for example, and the resultant ester is cyclized in the presence of a transition metal catalyst, such as a gold-containing catalyst, for example. A procedure of this kind is described in Org. Lett. 2006, 8, 515-518, for example, hereby incorporated by reference.

Used with preference in the coating material compositions of the invention are compounds (B) in which in the formula (I') $R^1$ and $R^2$ are each hydrogen or $C_1$-$C_6$ alkyl, more particularly methyl, and/or $R^3$ is hydrogen. Likewise preferred is use of compounds (B) in which in the formula (I') A is ethanediyl, X is O, Z is C=O, and Y is a chemical bond.

The compound (B) is constructed preferably from polymerized ethylenically unsaturated compounds (M), said compounds (M) comprising at least 10 wt %, based on the total amount of the ethylenically unsaturated compounds that form the polymer, of at least one compound of the formula (I)

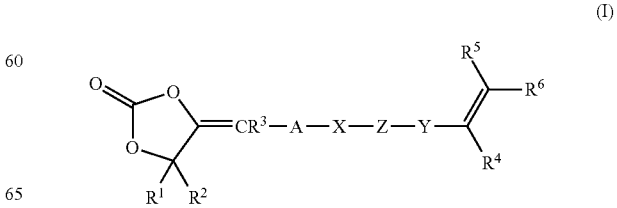

and in which A, X, Y, Z, $R^1$, $R^2$, and $R^3$ have the definitions stated in the text above and $R^4$ is hydrogen, $C_1$-$C_4$ alkyl, $CH_2COOR^8$, phenyl, or phenyl-$C_1$-$C_4$ alkyl;

$R^5$ and $R^6$ independently of one another are hydrogen or $C_1$-$C_4$ alkyl or else one of the radicals, $R^5$ or $R^6$, may be $COOR^8$ or $CH_2COOR^8$, and $R^8$ where present is hydrogen or $C_1$-$C_6$ alkyl.

In one particularly preferred embodiment of the present invention the compound (B) is constructed from 10 to 80 wt %, preferably 25 to 70 wt %, and more preferably 35 to 65 wt % of at least one compound of the formula (I) and 20 to 90 wt %, preferably 30 to 75 wt %, more particularly 35 to 65 wt % of at least one monoethylenically unsaturated comonomer (b), the wt % figures being based in each case on the total weight of all compounds (I) plus all comonomers (b). The sum of the weight fractions of all compounds (I) plus all comonomers (b), accordingly, always makes 100 wt %.

The compound (B) comprises preferably at least two monoethylenically unsaturated comonomers (b) that are different from one another, more preferably 2 to 6 monoethylenically unsaturated comonomers (b) that are different from one another.

With particular preference the comonomers (b) are selected from the group of esters of monoethylenically unsaturated aliphatic monocarboxylic acids with aliphatic alkanols, or esters of monoethylenically unsaturated aliphatic monocarboxylic acids with cycloaliphatic alkanols, or vinylaromatic compounds, or mixtures of at least two of these comonomers (b).

Especially preferred are the comonomers (b) selected from the group of esters of monoethylenically unsaturated $C_3$-$C_6$-monocarboxylic acids with $C_1$-$C_8$ alkanols, or the esters of monoethylenically unsaturated $C_3$-$C_6$ monocarboxylic acids with $C_5$-$C_8$ cycloalkanols, or vinylaromatic compounds, or mixtures of at least two of these comonomers (b).

Examples of esters of monoethylenically unsaturated aliphatic monocarboxylic acids with aliphatic alkanols that are suitable as comonomers (b) are, in particular, the esters of acrylic acid and methacrylic acid such as methyl acrylate, ether acrylate, n-butyl acrylate, 2-butyl acrylate, isobutyl acrylate, tert-butyl acrylate, and 2-ethylhexyl acrylate, methyl methacrylate, ethyl methacrylate, n-butyl methacrylate, 2-butyl methacrylate, isobutyl methacrylate, tert-butyl methacrylate, 2-ethylhexyl methacrylate, 3,3,5-trimethylhexyl acrylate, 3,3,5-trimethylhexyl methacrylate, stearyl acrylate, stearyl methacrylate, lauryl acrylate, or lauryl methacrylate, and also the corresponding esters of crotonic acid and isocrotonic acid.

Examples of esters of monoethylenically unsaturated monocarboxylic acids with cycloaliphatic alkanols that are suitable as comonomers (b) are esters of acrylic acid and methacrylic acid such as cyclopentyl acrylate, cyclohexyl acrylate, cyclopentyl methacrylate, cyclohexyl methacrylate, isobornyl acrylate, isobornyl methacrylate, and also the corresponding esters of crotonic acid and isocrotonic acid.

Examples of vinylaromatic hydrocarbons suitable as comonomers (b) are styrene, α-methylstyrene, and the vinyltoluene isomers.

As comonomer (b) it is therefore possible in this case to make use in particular of mixtures of at least two, preferably 2 to 6, different esters of monoethylenically unsaturated aliphatic monocarboxylic acids with aliphatic alkanols, or mixtures of at least two, preferably 2 to 6, different esters of monoethylenically unsaturated aliphatic monocarboxylic acids with cycloaliphatic alkanols, or mixtures of at least two, preferably 2 to 6, different vinylaromatic hydrocarbons.

Particular preference is given to using mixtures of at least two, preferably 2 to 6, different comonomers of at least one ester of monoethylenically unsaturated $C_3$-$C_6$ monocarboxylic acids with $C_1$-$C_8$ alkanols with at least one vinylaromatic hydrocarbon, or mixtures of at least two, preferably 2 to 6, different comonomers of at least one ester of monoethylenically unsaturated $C_3$-$C_6$ monocarboxylic acids with $C_1$-$C_8$ alkanols with at least one ester of monoethylenically unsaturated $C_3$-$C_6$ monocarboxylic acids with $C_5$-$C_8$ cycloalkanols, or mixtures of at least two, preferably 2 to 6, different comonomers of at least one ester of monoethylenically unsaturated $C_3$-$C_6$ monocarboxylic acids with $C_5$-$C_8$ cycloalkanols with at least one vinylaromatic hydrocarbon, or mixtures of 3 to 6 different comonomers of at least one ester of monoethylenically unsaturated $C_3$-$C_6$ monocarboxylic acids with $C_1$-$C_8$ alkanols with at least one ester of monoethylenically unsaturated $C_3$-$C_6$ monocarboxylic acids with $C_5$-$C_8$ cycloalkanols and with at least one vinylaromatic hydrocarbon.

Especially preferred is the use of a mixture of a vinylaromatic hydrocarbon and 2 to 4 different alkyl esters of $C_1$-$C_8$ alkanols with acrylic acid and/or with methacrylic acid.

The compounds (B) used in accordance with the invention generally have a number-average molecular weight in the range from 300 to 100 000 daltons, more particularly in the range from 500 to 15 000 daltons, more preferably from 900 to 10 000 daltons, and weight-average molecular weights of between 500 and 200 000 daltons, preferably 500 to 20 000 daltons, and more preferably between 1000 and 15 000 daltons, in each case measured by means of gel permeation chromatography (GPC) against a polystyrene standard.

The polymerization of the monomers can be carried out according to customary methods of radical polymerization. These include solution and precipitation polymerization, suspension polymerization, and emulsion polymerization, including a miniemulsion polymerization. The polymerization takes place more particularly by solution polymerization.

Suitable solvents or diluents are more particularly those in which the monomers M to be polymerized are soluble. Suitable solvents encompass, in particular, aprotic solvents. These include aliphatic and cycloaliphatic hydrocarbons and halogenated hydrocarbons, aromatic hydrocarbons and aromatic halogenated hydrocarbons, alkyl esters and cycloalkyl esters of aliphatic monocarboxylic acids, N,N-dialkyl amides of aliphatic carboxylic acids, alicyclic and cyclic ketones, ethers, and mixtures of the aforementioned aprotic solvents.

In general the amount of organic solvent will be calculated such that the amount of the monomers to be polymerized, based on the total amount of monomers plus solvent, is in the range from 10 to 65 wt %, more particularly in the range from 20 to 60 wt %. In the case of a solution polymerization, accordingly, polymer solutions with solids contents in the range from 10 to 90 wt % and more particularly 20 to 80 wt % are obtained.

The polymerization of the monomers may take place in accordance with customary methods of radical copolymerization. For these purposes, generally speaking, the monomers will be polymerized under reaction conditions in which radicals are formed.

Radical formation is generally accomplished through use of what is called a polymerization initiator—that is, a compound which forms radicals on decomposition, which can be triggered chemically, thermally, or photochemically.

The suitable polymerization initiators include organic azo compounds, organic peroxides and hydroperoxides, inorganic peroxides, and what are called redox initiators.

Established practice in particular is to include a small portion of the monomers, such as 0.1 to 20 wt %, for example, based on the total amount of the monomers to be polymerized, optionally together with a portion or the entirety of polymerization initiator and with a portion or the entirety of the solvent or diluent, in the initial charge to the polymerization vessel, to commence the polymerization, by heating of the polymerization mixture, for example, and then to add the remainder of the monomers and, where necessary, the remainder of the polymerization initiator and solvent in the course of the polymerization.

The polymerization temperatures typically employed are generally, depending on the initiator system selected, in the range from 20 to 200° C., more particularly in the range from 40 to 180° C., and especially in the range from 80 to 160° C.

The polymerization pressure is of minor importance and may be situated in the region of atmospheric pressure or slight subatmospheric pressure, e.g., >800 mbar, or at superatmospheric pressure, e.g., at up to 10 bar, and higher or lower pressures may likewise be employed.

The polymerization time will generally not exceed 10 hours and is frequently situated in the range from 1 to 8 hours.

Preference in accordance with the invention is given to using coating material compositions which comprise from 89.99 to 30 wt %, preferably from 79.9 to 40 wt %, of the compound(s) (B), based in each case on the binder fraction of the coating material [that is, based on the total weight of the binder fraction of the compounds (B) of the invention having functional groups of the formula I' plus the binder fraction of the polyol (A) plus the binder fraction of component (C) plus the weight of the catalyst (D)].

Catalyst (D)

The coating material compositions of the invention comprise at least one catalyst (D) for the crosslinking. The catalysts are used more particularly in fractions from 0.01 wt % to about 10 wt %, preferably 0.1 to 5 wt %, based in each case on the total weight of the binder of the compounds (B) of the invention having functional groups of the formula I' plus binder fraction of the polyol (A) plus binder fraction of component (C) plus weight of the catalyst (D).

The catalyst (D) is preferably an amine and/or a zinc-amidine complex. Examples of suitable catalysts are monomeric and/or oligomeric amines, more particularly aliphatic and/or cycloaliphatic and/or aromatic and/or araliphatic amines, more preferably cyclic and bicyclic amines, such as, for example, 1,4-diazabicyclo[2.2.2]octane, 4-(dimethylamino)pyridine, 1,5-diazabicyclo[4.3.0]non-5-ene, 1,8-diazabicyclo[5.4.0]undec-7-ene, and 1,5,7-triazabicyclo-[4.4.0]dec-5-ene. Further suitable as catalyst (D) are also amidines of the formula (DI) and derivatives thereof, more particularly derivatives based on a zinc-amidine complex which is preparable by reacting one or more zinc(II) biscarboxylates with an amidine of the formula (DI) or with a mixture of two or more amidines of the formula (DI)

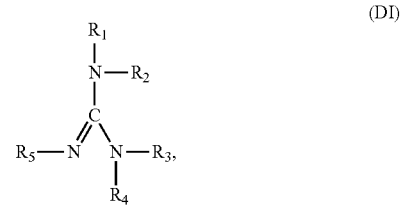

where $R_5$=hydrogen and $R_1$, $R_2$, $R_3$, and $R_4$ are each identical or different radicals, with $R_1$ and $R_3$ being hydrogen or an alkyl radical or an aryl radical, and $R_2$ and $R_4$ being an alkyl radical or an aryl radical.

Amidines of these kinds and also derivatives thereof are described in WO 2012/123166, WO 2012/123161 and WO 2012/123198, for example. Furthermore, the imidazoles and derivatives thereof that are identified in WO 2012/126796 and in WO 2013/110712 are also suitable as catalysts.

The Combination of Components (A), (B), Optionally (C), (D), and Also Further Components of the Coating Material Compositions The two-component (2K) coating material compositions that are particularly preferred in accordance with the invention are formed by the mixing, in a conventional way shortly before the coating material is applied, of a paint component comprising the polyhydroxyl group-containing compound (A) and also further components, described below, with a further paint component comprising the carbonate group-containing compound (B) and also, optionally, further of the components described below, with the paint component comprising the compound (A) generally comprising the catalyst (D) and also a part of the solvent.

The polyhydroxyl group-containing component (A) may be present in a suitable solvent. Suitable solvents are those which permit sufficient solubility of the polyhydroxyl group-containing component.

The weight fractions of the polyol (A) and optionally (C) and of the compounds (B) are preferably selected such that the molar equivalents ratio of the hydroxyl groups of the polyhydroxyl group-containing compound (A) plus optionally (C) to the carbonate groups (I') of component (B) is between 1:0.5 and 1:1.5, preferably between 1:0.8 and 1:1.2, more preferably between 1:0.9 and 1:1.1.

The polyhydroxyl group-containing component (A), the polyhydroxyl component (C) and/or the polycarbonate component (B) may be present in a suitable solvent.

Solvents (L) especially suitable for the coating materials of the invention are those which in the coating material are chemically inert toward the compounds (A), (B), and optionally (C) and which also do not react with (A), optionally (C), and (B) during the curing of the coating material. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone, or methyl amyl ketone, esters, such as ethyl acetate, butyl acetate, pentyl acetate, or ethyl ethoxypropionate, ethers or mixtures of the aforementioned solvents. The aprotic solvents or solvent mixtures preferably have a water content of not more than 1 wt %, more preferably not more than 0.5 wt %, based on the solvent.

In the coating material compositions of the invention, the solvent or solvents are used preferably in an amount such that the binder content of the coating material composition is at least 50 wt %, more preferably at least 60 wt %. It should be borne in mind here that in general, with higher solids content, the viscosity of the coating material composition goes up, and the leveling of the coating material composition and hence the overall visual impression given by the cured coating become poorer.

The binder mixture of the invention or the coating material composition of the invention may further comprise at least one customary and known coatings additive (F), different from components (A), (B), (C), and (D), in effective amounts, i.e., in amounts preferably up to 30 wt %, more preferably up to 20 wt %, and more particularly up to 10 wt %, based in each case on the total weight of the binder fraction of the compounds (B) of the invention plus binder fraction of the polyol (A) plus binder fraction of component (C) plus weight of the catalyst (D).

Examples of suitable coatings additives (F) are as follows:
especially UV absorbers;
especially light stabilizers such as HALS compounds, benzotriazoles, or oxalanilides;
radical scavengers;
slip additives;
polymerization inhibitors;
defoamers;
reactive diluents different from components (A) and (C), more particularly reactive diluents which become reactive only on reaction with further constituents and/or water, such as Incozol or aspartic esters, for example;
wetting agents different from components (A) and (C), such as siloxanes, fluorine compounds, carboxylic monoesters, phosphoric esters, polyacrylic acids and copolymers thereof, or polyurethanes;
adhesion promoters;
flow control agents;
rheological assistants, based for example on customary hydrophilic and/or hydrophobic fumed silica, such as various Aerosil® grades, or customary urea-based rheological assistants;
film-forming auxiliaries such as cellulose derivatives;
fillers such as, for example, nanoparticles based on silicon dioxide, aluminum oxide, or zirconium oxide; for further details, refer to Rompp Lexikon "Lacke und Druckfarben", Georg Thieme Verlag, Stuttgart, 1998, pages 250 to 252;
flame retardants.

Particularly preferred are coating material compositions which comprise 20 to 59.9 wt %, based on the binder fraction of the coating material composition, with at least one polyhydroxyl group-containing polyacrylate (A) and/or of at least one polyhydroxyl group-containing polymethacrylate (A) and/or of at least one polyhydroxyl group-containing polyester polyol and/or of a polyhydroxyl group-containing polyurethane (A), 79.9 to 40 wt %, based on the binder fraction of the coating material composition, of at least one compound (B), 0 to 10 wt % based on the binder fraction of the coating material composition, of the hydroxyl group-containing component (C), 0.1 to 5 wt %, based on the binder fraction of the coating material composition of the invention, of at least one catalyst (D) for the crosslinking, 0 to 20 wt %, based on the binder fraction of the coating material composition, of at least one customary and known coatings additive (F), the sum of all the components always making 100 wt %.

The binder fraction of the coating material composition is determined prior to crosslinking by weighing out a small sample (P) of the coating material composition and subsequently determining the solids by drying it at 130° C. for 60 minutes, cooling it, and then reweighing it. The residue corresponds to the binder fraction of the sample (P). The binder fraction of the coating material composition, in wt %, is then given, correspondingly, by 100 multiplied by the quotient formed from the weight of the residue of the sample (P) after drying at 130° C., divided by the weight of the sample (P) prior to drying.

The binder fraction of the individual components (A) or (B) or (C) of the coating material is determined analogously by weighing out a small sample (P) of the respective component (A) or (B) or (C) and subsequently determining the solids by drying it at 130° C. for 60 minutes, cooling it, and then reweighing it. The binder fraction of the component in wt % is then given, correspondingly, by 100 multiplied by the quotient formed from the weight of the residue of the respective sample (P) after drying at 130° C., divided by the weight of the respective sample (P) prior to drying.

In a further embodiment of the invention, the binder mixture of the invention or the coating material composition of the invention may further comprise additional pigments and/or fillers and may serve for the production of pigmented topcoats or pigmented undercoats or primer-surfacers more particularly pigmented topcoats. The pigments and/or fillers employed for these purposes are known to the skilled person. The pigments are typically used in amounts such that the pigment-to-binder ratio is between 0.05:1 and 1.5:1, based in each case on the binder fraction of the coating material composition.

Since the coatings of the invention produced from the coating materials of the invention adhere outstandingly even to already-cured electrocoats, primer-surfacer coats, basecoats or customary and known clearcoats, they are outstandingly suitable, in addition to their use in automotive OEM (production-line) finishing, for automotive refinishing and/or for the coating of parts for installation in or on motor vehicles, and/or for the coating of commercial vehicles.

The application of the coating material compositions of the invention may take place by any of the customary application methods, such as, for example, spraying, knife-coating, spreading, pouring, dipping, impregnating, trickling or rolling. With respect to such application, the substrate to be coated may itself be at rest, with the application unit or equipment being moved. Alternatively, the substrate to be coated, more particularly a coil, may be moved, with the application unit being at rest relative to the substrate or being moved appropriately.

Preference is given to employing spray application methods, such as, for example, compressed air spraying, airless spraying, high speed rotation, electrostatic spray application (ESTA), alone or in conjunction with hot spray application such as hot air spraying, for example.

The curing of the applied coating materials of the invention may take place after a certain rest time. The rest time serves, for example, for the leveling and degassing of the coating films or for the evaporation of volatile constituents such as solvents. The rest time may be assisted and/or shortened through the application of elevated temperatures and/or through a reduced atmospheric humidity, provided that this does not entail any instances of damage to or change in the coating films, such as a premature complete crosslinking.

The thermal curing of the coating materials has no peculiarities in terms of method, but instead takes place in accordance with the customary and known methods, such as heating in a forced air oven or irradiation with IR lamps.

This thermal curing may also take place in stages. Another preferred curing method is that of curing with near infrared (NIR radiation).

The thermal curing takes place advantageously at a temperature of 20 to 200° C., preferably 40 to 190° C. and more particularly 50 to 180° C., for a time of 1 min up to 10 h, preferably 2 min to 5 h and more particularly 3 min to 3 h, with longer cure times also being employable at low temperatures. For automotive refinishing and for the coating of plastics parts, and also for the coating of commercial vehicles, relatively low temperatures are typically employed here, of preferably between 20 and 80° C., more particularly between 20 and 60° C.

The coating materials of the invention are outstandingly suitable as decorative, protective and/or effect coatings and finishes on bodywork of means of transport (especially motor vehicles, such as cycles, motorcycles, buses, lorries or cars) or of parts thereof; on the interior and exterior of edifices; on furniture, windows and doors; on plastics moldings, especially CDs and windows; on small industrial parts, on coils, containers and packaging; on white goods; on films; on optical, electrical and mechanical components; and also on hollow glassware and articles of everyday use.

The coating material compositions of the invention can therefore be applied, for example, to an uncoated or precoated substrate, the coating materials of the invention being either pigmented or unpigmented. The coating material compositions and paint systems of the invention in particular, more particularly the clearcoats, are employed in the technologically and esthetically particularly demanding field of automotive OEM finishing and for the coating of plastics parts for installation in or on car bodies, more particularly for top-class car bodies, such as, for example, for producing roofs, hatches, bonnets, fenders, bumpers, spoilers, sills, protective strips, side trim and the like, and for the finishing of commercial vehicles, such as, for example, of lorries, chain-driven construction vehicles, such as crane vehicles, wheel loaders and concrete mixers, buses, rail vehicles, watercraft, aircraft, and also agricultural equipment such as tractors and combines, and parts thereof, and also for automotive refinishing, with automotive refinishing encompassing not only the repair of the OEM finish on the line but also the repair of local defects, such as scratches, stone chip damage and the like, for example, and also complete recoating in corresponding repair workshops and car paint shops for the value enhancement of vehicles.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably used with a polycarbonate fraction>40%, more particularly >50%.

ASA refers generally to impact-modified styrene/acrylonitrile polymers, in which graft copolymers of vinylaromatic compounds, more particularly styrene and of vinyl cyanides, more particularly acrylonitrile, are present on polyalkyl acrylate rubbers in a copolymer matrix of, in particular, styrene and acrylonitrile.

With particular preference, the coating material compositions of the invention are used in multistage coating processes, more particularly in processes in which an optionally precoated substrate is coated first with a pigmented basecoat film and then with a film with the coating material composition of the invention. The invention accordingly also provides multicoat color and/or effect finishes comprising at least one pigmented basecoat and at least one clearcoat applied thereon, these finishes being characterized in that the clearcoat has been produced from the coating material composition of the invention.

Not only water-thinnable basecoats but also basecoats based on organic solvents can be used. Suitable basecoats are described in, for example, EP-A-0 692 007 and in the documents listed therein at column 3 lines 50 et seq. Preferably, the applied basecoat is first dried—that is, in an evaporation phase, at least some of the organic solvent and/or of the water is removed from the basecoat film. Drying takes place preferably at temperatures from room temperature to 80° C. After drying has taken place, the coating material composition of the invention is applied. The two-coat finish is subsequently baked, preferably under conditions employed in automotive OEM finishing, at temperatures from 20 to 200° C. for a time of 1 min up to 10 h; in the case of the temperatures employed for automotive refinishing, which in general are between 20 and 80° C., more particularly between 20 and 60° C., longer cure times may also be employed.

In another preferred embodiment of the invention, the coating material composition of the invention is used as a transparent clearcoat for the coating of plastics substrates, particularly of plastics parts for interior or exterior installation. These plastics parts for interior or exterior installation are preferably coated likewise in a multistage coating process, in which an optionally precoated substrate or a substrate which has been pretreated for enhanced adhesion of the subsequent coatings (by means, for example, of flaming, corona treatment or plasma treatment of the substrate) is coated first with a pigmented basecoat film and thereafter with a film with the coating material composition of the invention.

EXAMPLES

Preparation of 5-methyl-hex-3-yne-1,5-diol

Synthesis took place as per Bull. Acad. Sci. USSR 1965, 683.

In an 8 L reactor with 3-stage 2-blade offset shearing-blade stirrer and thermostat, at 20° C. under an $N_2$ atmosphere, 100.0 g (1.384 mol) of 3-butyn-1-ole (purity 97.0%, Acros) were dissolved in 3.92 L of toluene (purity 99.9%, BASF SE) and with stirring 320.0 g (4.848 mol) of KOH (purity 85.0%, BASF SE) were added. Over the course of 20 minutes a mixture of 441.0 mL (6.00 mol) of acetone and 320.9 mL of toluene was added. Added slowly to the reaction mixture were 3 L of fully demineralized water, in order to dissolve the solid fully. The phases were separated and the aqueous phase was extracted with twice 2 L of ethyl acetate. The solvent was removed from the combined organic phases under reduced pressure (50° C., about 5 mbar). This gave 183.5 g of the product.

The identity of the product of the title compound was verified by gas chromatography (GC method: ESMA6F, 30 m RTX-5-amine 1 μm. 32 mm/80-0-R: 15° C./min-250).

Preparation of 5-hydroxy-5-methyl-hex-3-ynyl acetate 100 g (0.78 mol) of 5-methyl-hex-3-yne-1,5-diol were dissolved in 800 mL of dichloromethane and cooled to 0° C. 113 mL (1.11 mol) of acetic anhydride were added in one portion. 127 mL (1.25 mol) of triethylamine were cooled to 0-2° C. and added over the course of 20 minutes. The reaction mixture was stirred at 0° C. for 2 hours. The cooling was removed and the reaction batch was stirred at 20° C. for 16 hours. The mixture was cooled to 0° C. and 1200 mL of 5% strength hydrochloric acid were added, the temperature of the reaction mixture being held below 5° C. The batch was extracted with three times 150 mL of tert-butyl methyl ether (MTBE) and the combined organic phases were stirred four times for about 1 hour in each case with 400 mL each time of 5% strength aqueous sodium hydrogen carbonate solution, in each case until gas evolution was no longer observed. The organic phase was washed with 1 L of fully demineralized water, and dried over sodium sulfate, and the solvent was removed. This gave 122.21 g (yield 92%) of a clear, dark yellow liquid. The purity was determined by gas chromatography to be 99.5%.

$1^H$ NMR (CDCl$_3$, 500 MHz): 1.5 (s, 6H, C(CH$_3$)$_2$), 2.1 (s, 3H, C(O)CH$_3$), 2.5 (t, 2H, CH$_2$CH$_2$O), 3.4 (bs, 1H, OH), 4.1 (t, 2H, CH$_2$CH$_2$O) ppm.

Preparation of 4,4-dimethyl-5-(3-acetoxypropylidene)-1,3-dioxolan-2-one (exo-VC-OAc)

A 300 mL autoclave was charged with 50 g of 5-hydroxy-5-methyl-hex-3-ynyl acetate in 74 mL of toluene. Added to this initial charge was 0.9 g of silver acetate and 7.8 g of 1,8-diazabicyclo[5.4.0]undec-7-ene (DBU). The reaction batch was heated to 70° C. and a CO$_2$ pressure of 50 bar was established. After 40 hours, the autoclave was let down to atmospheric pressure and the reaction batch was washed with twice 100 mL of water and with 100 mL of 5% strength hydrochloric acid. The combined aqueous phases were extracted with 100 mL of toluene and the combined organic phases were dried over sodium carbonate. The solvent was removed and the residue obtained was recrystallized from 200 g of cyclohexane. This gave 35 g of the product of the title compound (purity>99%). The identity of the title compound was verified by gas chromatography (GC method: 30 m FFAP ID=0.32 mm, FD=0.25 μm; 80° C. 6K/min to 250° C. temp. holding; retention time: 20.6 minutes).

$^1$H NMR (CDCl$_3$, 500 MHz): 1.5 (s, 6H, C(CH$_3$)$_2$), 2.1 (s, 3H, C(O)CH$_3$), 2.5 (t, 2H, CH$_2$CH$_2$O), 3.4 (bs, 1H, OH), 4.1 (t, 2H, CH$_2$CH$_2$O) ppm.

Preparation of [(3Z)-3-(5,5-dimethyl-2-oxo-1,3-dioxolan-4-ylidene)propyl]acrylate (exo-VCA)

280 g (1.31 mol) of [(3Z)-3-(5,5-dimethyl-2-oxo-1,3-dioxolan-4-ylidene)propyl]acetate (exo-VC-OAc), 1307 g (13.1 mol) of ethyl acrylate, 0.28 g of 4-methoxyphenol (MeHQ), and 84 g (30 wt %) of Novozym® 435 from Novozymes were combined. The batch was stirred at 40° C. for 24 hours. The batch was filtered, the filter product was washed with acetone, and the solvent was removed on a rotary evaporator at 40° C. This gave 276.7 g of the product of the title compound, with a purity of 92.4% (GC analysis).

$1^H$ NMR (CDCl$_3$, 400 MHz): 1.6 (s, 6H), 2.5 (q, 2H), 4.2 (t, 2H), 4.7 (t, 1H), 5.84-5.87 (dd, 1H), 6.09-6.16 (dd, 1H), 6.37-6.42 (dd, LH) ppm.

Preparation of a copolymer with exo-VCA (Component (B1))

A glass flask heated by oil bath and equipped with stirrer, thermometer, and two feed vessels was charged with 100 g of butyl acetate 98/100. For the monomer mixture, 20 g of n-butyl acrylate, 20 g of n-butyl methacrylate, 30 g of methyl methacrylate, 50 g of styrene, and 80 g of exo-VCA were charged to one of the feed vessels. (Final solids content: 50%). The mixture was heated to 125° C. under a stream of nitrogen and with stirring. In a further feed vessel, a solution of 12 g of TBPEH (=tertiary-butyl per-2-ethylhexanoate, from Pergan, Bocholt, or United Initiators, Pullach) is introduced. When 125° C. have been reached, the initial initiator feed is commenced at a rate such that the total feed time is 220 minutes. 10 minutes after the initial initiator feed, the monomer mixture is commenced, with a total feed time of 180 minutes. (=Subsequent initiator feed of 30 minutes). After the end of all the feeds, the reaction mixture is held at this temperature for a further 180 minutes, and then cooled.

The viscosity of the resulting mixture (measured by means of a Brookfield CAP 2000 rotary viscometer, spindle 3, 1000 rpm) is found to be 39 mPa*s; the solids (1 h 130° C.) is 44%±1%; the acid number is 1.4 mg KOH/g resin solids, and the equivalent weight is 555 g. The number-average molecular weight is 3025 daltons, and the weight-average molecular weight is 8315 daltons, each determined by means of gel permeation chromatography using the Agilent 1100 Series instrument at 35° C., with a high-performance liquid chromatography pump and with the refractive index detector Agilent RIGI 1362A+UV G 1314A, against a polystyrene standard.

Preparation of the Hydroxyl-Containing Polymers (A1) to (A7)

Polyester A1

In a 3.5 l reactor provided with a stirrer, reflux condenser, and water separator, 374.7 g of tris(2-hydroxyethyl)isocyanurate, 165.7 g of hexahydrophthalic anhydride, and 107.6 g of xylene are combined and heated to 100° C. After an exothermic reaction has occurred, the reaction mixture is heated to 136° C. and, on reaching this temperature, is then cooled down again to 82° C. Then 477.8 g of phthalic anhydride are added and the reaction mixture is again heated to 100° C. After an exothermic reaction has occurred, the temperature is raised to 145° C., held for 10 minutes, and then lowered to 140° C. Subsequently 981.4 g of Cardura®E10 (commercial glycidyl ester of Versatic acid, from Momentive) are added. After a further exothermic reaction has been traversed, the temperature is held at 145° C. for 2.5 hours. The reaction mixture is then cooled to 80° C. and admixed with 392.8 g of butyl acetate.

Polyester A2

In a 3.5 l reactor provided with a stirrer, reflux condenser, and water separator, 374.7 g of tris(2-hydroxyethyl)isocyanurate, 165.7 g of hexahydrophthalic anhydride, and 107.6 g of xylene are combined and heated to 100° C. After an exothermic reaction has occurred, the reaction mixture is heated to 136° C. and, on reaching this temperature, is then cooled down again to 82° C. Then 477.8 g of phthalic anhydride are added and the reaction mixture is again heated to 100° C. After an exothermic reaction has occurred, the temperature is raised to 145° C., held for 10 minutes, and then lowered to 140° C. Subsequently 1076.4 g of Cardura®E10 (commercial glycidyl ester of Versatic acid, from Momentive) are added. After a further exothermic reaction has been traversed, the temperature is held at 145° C. for 2.5 hours. The reaction mixture is then cooled to 80° C. and admixed with 392.8 g of butyl acetate.

Polyester A3

In a 3.5 l reactor provided with a stirrer, reflux condenser, and water separator, 136.2 g of Penta-R (commercial pentaerythritol from BASF S.E.), 154 g of hexahydrophthalic anhydride, 33.1 g of Solventnaphta®, and 130.3 g of xylene are combined and heated to 100° C. After an exothermic reaction has occurred, the reaction mixture is heated to 136° C. and is then cooled down again to 82° C. Then a solution of 462 g of hexahydrophthalic anhydride in 22.9 g of Solventnaphtha® is added and the reaction mixture is again heated to 100° C. After an exothermic reaction has occurred, the temperature is raised to 145° C., held for 10 minutes, and then lowered to 140° C. Subsequently 913 g of Cardura®E10 in 25.6 g of Solventnaptha® are added. After a further exothermic reaction has been traversed, the temperature is held at 145° C. for 2.5 hours. Thereafter the reaction mixture is cooled to 120° C. and admixed with 60.1 g of Solventnaptha® and 60.1 g of xylene. The reaction mixture is cooled to 60° C. and admixed with a further 20 g of Solventnaptha®.

Polyester A4

In a 3.5 l reactor provided with a stirrer, reflux condenser, and water separator, 378.3 g of tris(2-hydroxyethyl)isocyanurate, 154 g of hexahydrophthalic anhydride, and 100 g of xylene are combined and heated to 100° C. After an exothermic reaction has occurred, the reaction mixture is heated to 136° C. and is then cooled down again to 82° C. Then 444 g of phthalic anhydride are added and the reaction mixture is again heated to 100° C. After an exothermic reaction has occurred, the temperature is raised to 145° C., held for 10 minutes, and then lowered to 140° C. Subsequently 1140 g of Cardura®E10 (commercial glycidyl ester of Versatic acid, from Momentive) are added. After a further exothermic reaction has been traversed, the temperature is held at 145° C. for 2.5 hours. The reaction mixture is then cooled to 80° C. and admixed with 421.5 g of butyl acetate.

TABLE 1 characteristics of the hydroxyl group-containing polyesters (A1) to (A4)

|  | (A1) | (A2) | (A3) | (A4) |
| --- | --- | --- | --- | --- |
| SC (%) | 79.9 | 79.1 | 81.0 | 73.3 |
| OHN (mgKOH/g) | 134 | 130 | 141 | 125 |
| AN (mgKOH/g) | 21 | 0 | 14 | 0 |
| Mn | 997 | 990 | 1262 | 907 |
| Mw | 1280 | 1315 | 1516 | 1302 |
| Mw/Mn | 1.3 | 1.3 | 1.2 | 1.4 |

Key to table 1:
SC (%) = Solids content in %, measured by evaporation of solvent at 130° C. for 1 h
OHN (mg KOH/g) = OH number in mg KOH/g, determined by titration
AN (mg KOH/g) = acid number in mg KOH/g, determined by titration
Mn, Mw = number-average and weight-average molecular weights, respectively, are determined by gel permeation chromatography with the Agilent 1100 Series instrument at 35° C., using a high-performance liquid chromatography pump and the Agilent RIGI 1362A + UV G 1314A refractive index detector, against a polystyrene standard Polyacrylate A5 and A6

To prepare the polyacrylate (A5), solvent for the polymerization is charged to a double-walled 4 l stainless steel tank which can be heated by means of an oil circulation thermostat and is equipped with thermometer, anchor stirrer, two dropping funnels, and a reflux condenser. One of the dropping funnels is charged with the monomer mixture, while the second dropping funnel is charged with the initiator solution, containing a suitable initiator (generally peroxide). The initial charge is heated to a polymerization temperature of 140° C. After the polymerization temperature has been reached, the initiator feed is started first of all. 15 minutes after the beginning of the initiator feed, the monomer feed (duration 240 minutes) is commenced. The initiator feed is set such that it continues for 30 minutes after the end of the monomer feed. After the end of the initiator feed, the mixture is stirred at 140° C. for 2 hours more and then cooled to room temperature. The reaction mixture is subsequently adjusted with solvent to the binder content indicated in table 2.

For the preparation of the acrylate A6, the acrylate A5 is heated to 145°, together with the amount of Cardura® E10 indicated in table 2, in a double-walled 2 l stainless steel vessel which can be heated by means of an oil circulation thermostat and is equipped with a thermometer and anchor stirrer. As soon as the acid number has fallen to <0.5, the mixture is cooled to room temperature.

TABLE 2 composition in parts by weight and characteristics of the hydroxyl group-containing polyacrylates (A5) and (A6)

|  | (A5) | (A6) |
| --- | --- | --- |
| Styrene | 20 | 20 |
| n-Butyl methacrylate | 15 | 15 |
| Hydroxypropyl methacrylate | 20 | 20 |
| Cyclohexyl methacrylate | 26 | 26 |
| Hydroxyethyl methacrylate | 18 | 18 |
| Acrylic acid | 1 | 1 |
| Cardura ®E10 | — | 5.36 |
| TBPEH | 12 | 12 |
| Solventnaphta ® 160/180 | 100 | 100 |
| Solids (%) | 60 | 64.5 |
| OH number (mgKOH/g) | 156 | 148 |
| Acid number (mgKOH/g) | 9 | <0.5 |
| Mn | 1600-2200 | 1338 |
| Mw | 3900-4500 | 4010 |
| Mw/Mn | 2.2 | 3.0 |

Key to table 2:
Cardura ® E10 = commercial glycidyl ester of Versatic acid, from Momentive
TBPEH = tertiary-butyl per-2-ethylhexanoate, from Pergan, Bocholt or United Initiators, Pullach
SC (%) = solids content in %, measured by evaporation of solvent at 130° C. for 1 h
OHN (mgKOH/g) = OH number in mgKOH/g, determined by titration
AN (mgKOH/g) = acid number in mgKOH/g, determined by titration
Mn, Mw = number-average and weight-average molecular weights, measured by gel permeation chromatography (GPC) against a polystyrene standard Polyurethane A7

First of all a hydroxyl-containing polyester is prepared in analogy to U.S. Pat. No. 6,946,515, preparation example 5, as follows:

In a steel reactor, 308 parts of hexahydrophthalic anhydride and 134 parts of trimethylolpropane are introduced and heated to 150° C. Then 457 parts of Cardura® E10 are metered in over an hour. The temperature is held at 150° C. until an acid number <3 mg KOH/g is reached. Butyl glycol acetate is added at 120° C. to give the resulting polyester a solids content of 83.0%. The polyester has an OH number of 185 mgKOH/g and an acid number of <3 mgKOH/g, determined in each case by titration.

In a 3.5 l reactor provided with a stirrer and a reflux condenser, 1198.1 g of polyester from the example above, 24.2 g of neopentyl glycol, 155.0 g of isopho-rone diisocyanate, 35.9 g of trimethylolpropane and 778.8 g of methyl ethyl ketone are combined and heated to 85° C. The temperature is maintained until the NCO groups fraction has dropped to 1.6%. Then, for chain extension, trimethylolpropane is added until the NCO content has fallen to 0%. This NCO content is determined in accordance with DIN EN ISO 11909. The reaction mixture is subsequently adjusted to a solids of 54.5% by addition of further methyl ethyl ketone.

TABLE 3 characteristics of the polyhydroxyl
group-containing polyurethane (A7)

| | |
|---|---|
| SC (%) | 54.5 |
| OHN (mgKOH/g) | 190 |
| AN (mgKOH/g) | 3.4 |
| Mn | 830 |
| Mw | 2109 |
| Mw/Mn | 2.5 |

Key to table 3:
SC (%) = Solids content in %, measured by evaporation of solvent at 130° C. for 1 h
OHN (mg KOH/g) = OH number in mg KOH/g, determined by titration
AN (mg KOH/g) = acid number in mg KOH/g, determined by titration
Mn, Mw = number-average and weight-average molecular weights, respectively, determined by gel permeation chromatography against a polystyrene standard Examples 1 to 10

Clearcoat Compositions

With the hydroxyl group-containing polymers (A1) to (A7) identified in table 4, and in accordance with the weighed amounts below, the respective first component of a two-component clearcoat was prepared. To produce two-component clearcoat coatings, the first components, each prepared in accordance with the above information, are homogenized with the second component (B1), the weighed amounts of which are identified in table 4, and immediately thereafter are investigated for their onset by means of DMA.

TABLE 4 composition of the clearcoat compositions in parts
by weight, and onset temperatures measured

| | Ex. 1 | Ex. 2 | Ex. 3 | Ex. 4 | Ex. 5 | Ex. 6 | Ex. 7 |
|---|---|---|---|---|---|---|---|
| (A1) | | | | | 25.74 | | |
| (A2) | | | | | | 26.45 | |
| (A3) | | | 24.63 | | | | |
| (A4) | | | | 29.37 | | | |
| (A5) | 31.32 | | | | | | |
| (A6) | | 28.65 | | | | | |
| (A7) | | | | | | | 30.34 |
| DBU | 0.50 | 0.55 | 0.49 | 0.50 | 0.49 | 0.50 | 0.50 |
| Butyl acetate | 6.81 | 8.92 | 15.76 | 14.04 | 15.85 | 15.91 | 3.23 |
| Exo VC acrylate (B1) | 61.38 | 61.89 | 59.11 | 56.09 | 57.92 | 57.14 | 65.93 |
| Sum total | 100.00 | 100.00 | 100.00 | 100.00 | 100.00 | 100.00 | 100.00 |
| Acid number A1-A6 (mgKOH/g) | 8-10 | <0.5 | 14 | 0 | 21.2 | 0.4 | 3.4 |
| Onset (° C.) | 114 | 40 | 136 | 42 | 131 | 44 | 53 |

Surprisingly it was found that the carbonate group-containing compounds (B) used in accordance with the invention have a carbonate group reactivity which is sufficiently high that they can be crosslinked without problems even with the hydroxyl groups, which are less reactive by comparison with amino groups.

The results in table 4 also show clearly that as the acid number of the hydroxyl-containing polymer (A) goes down, there is a drop in the onset temperature. In particular, when the acid number is not more than 10 mgKOH/g, a marked drop in the onset temperature is observed. For clearcoat compositions which are to be crosslinked at very low baking temperatures, the acid number of the hydroxyl group-containing polymer ought more preferably to be between 0 and 5 mgKOH/g, as shown by example 7, and very preferably less than 1 mgKOH/g, as shown by examples 2, 4 and 6.

Furthermore, with the hydroxyl group-containing polyester (A2) and with the carbonate group-containing polyacrylate (B1), a clearcoat composition was again formulated and was applied using a four-way bar applicator (FWBA) to steel panels (100 μm wet film thickness) which beforehand had been coated with a commercial baked cathodic electrocoat, with a commercial conventional baked primer-surfacer, and with a black waterborne basecoat material, which was baked at 140° C. for 20 minutes. The clearcoat was subsequently cured for 30 minutes at 80° C. or 100° C. or 140° C. The test results for the resultant coatings are set out in table 5.

TABLE 5 composition of the clearcoat compositions in parts
by weight, and test results of the coatings

| Example | 8 | 9 | 10 |
|---|---|---|---|
| Curing of clearcoat at | 80° C. | 100° C. | 140° C. |
| Carbonate (B1) (Exo VC acrylate) | 11.10 | 11.10 | 11.10 |
| (A2) | 5.00 | 5.00 | 5.00 |
| DBU | 1.90 | 1.90 | 1.90 |
| Butyl acetate 98/100 | 1.40 | 1.40 | 1.40 |
| Nonvolatile fraction | 50 | 50 | 50 |

TABLE 5-continued composition of the clearcoat compositions in parts
by weight, and test results of the coatings

| Example | 8 | 9 | 10 |
|---|---|---|---|
| (theoretical) Exo ratio VC:OH | 0.9:1 | 0.9:1 | 0.9:1 |
| Note on the coating material | clear | clear | clear |
| FWBA (wet film thickness in μm) | 100 | 100 | 100 |
| Substrate time [min] | 30 | 30 | 30 |

TABLE 5-continued composition of the clearcoat compositions in parts
by weight, and test results of the coatings

| Example | 8 | 9 | 10 |
|---|---|---|---|
| Substrate temperature [° C.] | 80 | 100 | 140 |
| Remarks/appearance after 1 h | clear, dry | clear, dry | clear, dry |
| MEK test (after 1 d storage at 25° C.) | >200 | >200 | >200 |
| Universal hardness at 25.6 mN [N/mm$^2$] | 45 | 60 | 53 |

Key to table 5:
The micropenetration hardness is determined in accordance with DIN EN ISO 14577-4.
In the MEK test, a swatch soaked in MEK is affixed to a hammer weighing 1 kg and is guided in back-and-forth strokes over the coating. A visual assessment is made of the number of back-and-forth strokes after which the paint becomes detached.

Discussion of the Test Results:

The results in table 5 show that coatings obtained with the clearcoat compositions of the invention exhibit good hardness and MEK resistance which also does not collapse at low baking temperatures.

The invention claimed is:

1. A nonaqueous coating material composition comprising:
    (A) an oligomeric and/or polymeric compound having at least two hydroxyl groups;
    (B) an oligomeric and/or polymeric compound having at least two alkylidene-1,3-dioxolan-2-one groups; and
    (D) a catalyst for the crosslinking,
    wherein
    the at least two alkyliden-1,3-dioxolan-2-one groups are of formula (I')

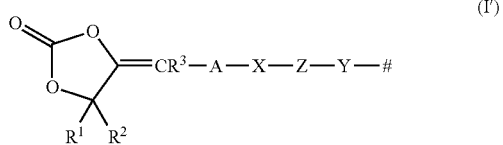

wherein
    # represents the attachment to the polymer backbone and
    $R^1$, $R^2$ are each independently hydrogen, $C_1$-$C_6$ alkyl, $C_1$-$C_4$ alkoxy-$C_1$-$C_4$ alkyl, $C_5$-$C_6$ cycloalkyl, phenyl or phenyl-$C_1$-$C_4$ alykl,
    $R^3$ is hydrogen, $C_1$-$C_6$ alkyl, $C_1$-$C_4$ alkoxy-$C_1$-$C_4$ alkyl, $C_5$-$C_6$ cycloalkyl, phenyl, or phenyl-$C_1$-$C_4$ alkyl,
    A is a chemical bond or $C_1$-$C_4$ alkanediyl,
    X is O or $NR^7$;
    Z is a chemical bond, $PO_2$, $SO_2$, or C=O,
    Y is a chemical bond, $CH_2$, or $CHCH_3$, and
    $R^7$ where present is $C_1$-$C_6$ alkyl.

2. The coating material composition of claim 1, wherein $R^1$ and $R^2$ are each hydrogen or $C_1$-$C_6$ alkyl, and/or wherein $R^3$ is hydrogen.

3. The coating material composition of claim 1, wherein A is ethanediyl, X is O, Z is C=O, and Y is a chemical bond.

4. The coating material composition of claim 1, wherein the compound (B) comprises polymerized ethylenically unsaturated compounds (M), the compounds (M) comprising comonomers (b) and at least 10 wt %, based on the total amount of the ethylenically unsaturated compounds (M) of a compound of formula (I)

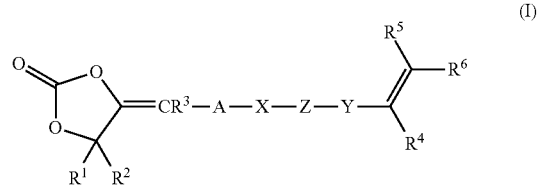

and
    wherein A, X, Y, Z, $R^1$, $R^2$, and $R^3$ are as defined in claim 1, and
    $R^4$ is hydrogen, $C_1$-$C_4$ alkyl, $CH_2COOR^8$, phenyl, or phenyl-$C_1$-$C_4$ alkyl;
    $R^5$ and $R^6$ are each independently hydrogen or $C_1$-$C_4$ alkyl, or else one of the radicals, $R^5$ or $R^6$, may be $COOR^8$ or $CH_2COOR^8$, and
    $R^8$ where present is hydrogen or $C_1$-$C_6$ alkyl.

5. The coating material composition of claim 1, wherein the compound (B) comprises 10 to 80 wt % of at least one compound of formula (I) and 20 to 90 wt of at least one monoethylenically unsaturated comonomer (b), the wt % figures being based in each case on the total weight of all compounds (I) plus all comonomers (b).

6. The coating material composition of claim 1, wherein the compound (B) comprises at least two monoethylenically unsaturated comonomers (b) different from one another.

7. The coating material composition of claim 6, wherein the comonomers (b) are selected from esters of monoethylenically unsaturated aliphatic monocarboxvlic acids with aliphatic alkanols, esters of monoethylenically unsaturated aliphatic monocarboxvlic acids with cycloaliphatic alkanols, vinylaromatic hydrocarbons, or mixtures of at least two of these comonomers (b).

8. The coating material composition of claim 1, wherein an OH number of the polyols (A) is from 30 to 400 mg KOH/g.

9. The coating material composition of claim 1, wherein an acid number of the polyol (A) is between 0 and 10 mg KOH/g.

10. The coating material composition of claim 1, wherein the polyol (A) is at least one selected from the group consisting of polyester polyols, polyurethane polyols, polysiloxane polyols, polyacrylate polyols, polymethacrylate polyols, and mixtures thereof.

11. The coating material composition of claim 1, comprising: 10 to 69.99 wt % of the oligomeric and/or polymeric compound (A) which is selected from the group consisting of a polyhydroxyl group-containing polyester, a polyhydroxyl group-containing poly(meth)acrylate, a polyhydroxyl group-containing polyurethane, and a mixture thereof, 89.99 to 30 wt %, of the compound (B), 0 to 20 wt % of a monomeric hydroxyl compound (C), and 0.01 to 10 wt % of a catalyst (D), wherein the wt % figures are based in each case on the binder fraction of the coating material, and the wt % sum of all components (A), (B), (C), and (D) is 100 wt %.

12. The coating material composition of claim 1, wherein the catalyst (D) is an amine and/or a zinc-arnidine complex.

13. A multistage coating method, comprising applying, to an optionally precoated substrate, a pigmented basecoat film and thereafter applying a film of the coating material composition of claim 1.

14. The multistage coating method of claim 13, wherein the application of the pigmented basecoat film is followed by drying of the applied basecoat first at temperatures from room temperature to 80° C., and application of the coating material composition is followed by curing at temperatures from 20 to 200° C., for a time of from one minute up to 10 hours.

15. A clearcoat composition comprising the coating material composition of claim 1.

16. A multicoat effect and/or color paint system comprising at least one pigmented basecoat film and at least one clearcoat film disposed thereon, wherein the clearcoat film has been produced from a coating material composition of claim 1.

\* \* \* \* \*